United States Patent [19]

Telford

[11] 4,137,009
[45] Jan. 30, 1979

[54] PIVOTED BLADE BARREL ROTOR WIND TURBINE

[75] Inventor: James W. Telford, Reno, Nev.

[73] Assignee: Board of Regents University of Nevada System, Reno, Nev.

[21] Appl. No.: 739,125

[22] Filed: Nov. 5, 1976

[51] Int. Cl.² ............................................. F03D 3/00
[52] U.S. Cl. .................................... 416/24; 416/119; 416/41; 74/568 T
[58] Field of Search .............. 74/568 T; 416/111, 119, 416/41, 23, 24

[56] References Cited

U.S. PATENT DOCUMENTS

| | | | |
|---|---|---|---|
| 1,190,629 | 7/1916 | Clade | 416/119 X |
| 1,419,000 | 6/1922 | Wilson | 416/41 |
| 1,556,012 | 10/1925 | Flettner | 416/23 |
| 1,953,444 | 4/1934 | Stalker | 416/41 X |
| 2,485,543 | 10/1949 | Andreau | 416/23 X |
| 2,622,686 | 12/1952 | Chevreau et al. | 416/23 |
| 2,642,143 | 6/1953 | Miller | 416/24 |
| 2,845,132 | 7/1958 | Heckman | 416/24 |
| 3,877,836 | 4/1975 | Tompkins | 416/111 X |
| 3,902,072 | 8/1975 | Quinn | 416/41 X |
| 3,958,463 | 5/1976 | Block et al. | 74/568 R |
| 3,978,345 | 8/1976 | Bailey | 416/111 X |
| 4,050,246 | 9/1977 | Bourquardez | 416/132 B X |
| 4,052,134 | 10/1977 | Rumsey | 416/119 |

FOREIGN PATENT DOCUMENTS 610434  3/1935  Fed. Rep. of Germany ............ 416/23

Primary Examiner—Everette A. Powell, Jr.
Attorney, Agent, or Firm—Schapp and Hatch

[57] ABSTRACT

The disclosed wind turbine has zero mean camber airfoil blades vertically pivoted at the outer ends of pairs of radius arms. The inner ends of the radius arms are fixed to a rotating mast. Each blade is provided with a steering vane. The deflection of each vane with respect to its associated blade is controlled by a cam toggle mechanism. The disclosed cam toggle mechanism includes a double-faced face cam, having a closed cam track on its upper face and another closed cam track on its lower face. Each cam track consists of two circular dwell portions.

42 Claims, 22 Drawing Figures

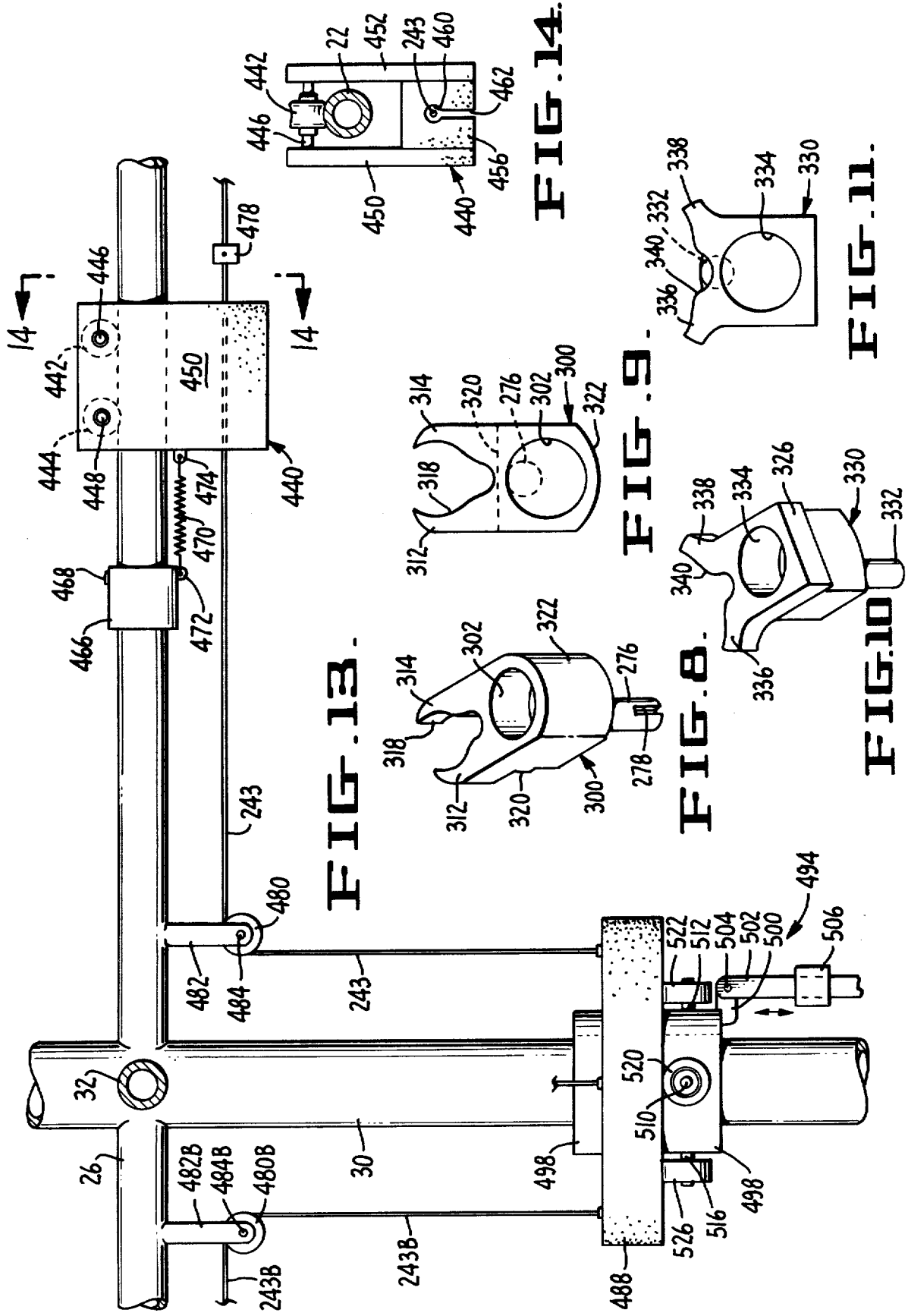

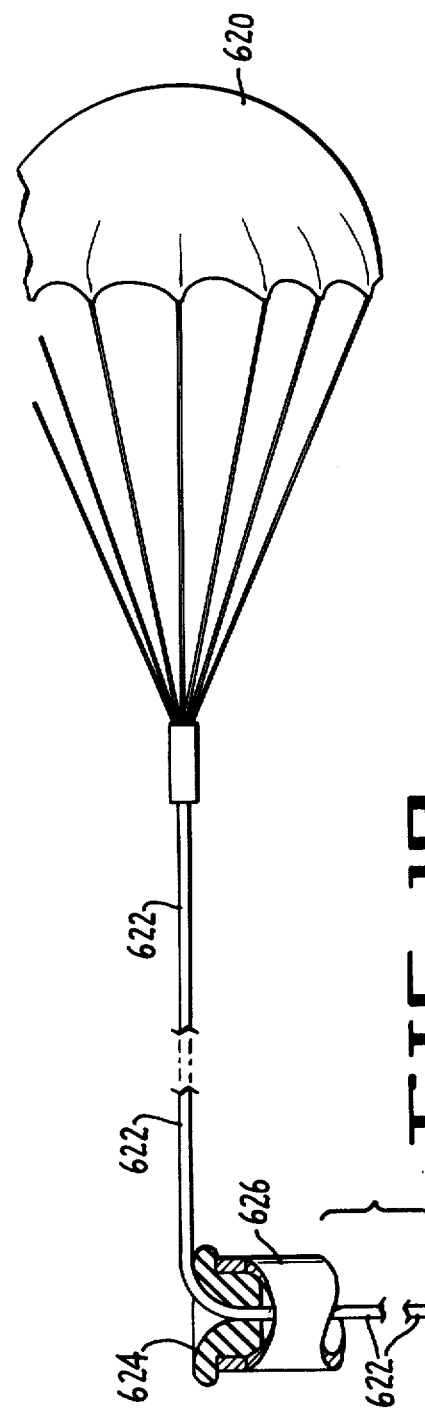
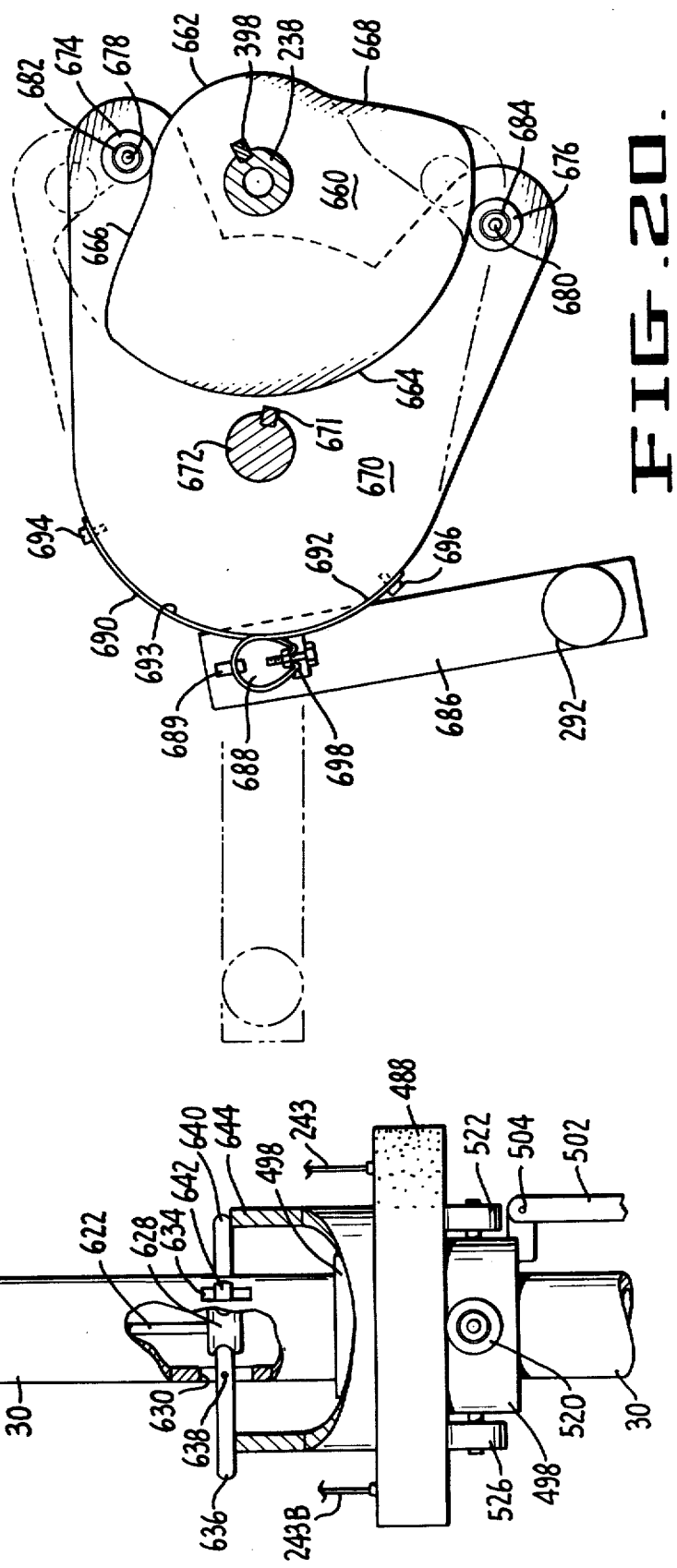

PIVOTED BLADE BARREL ROTOR WIND TURBINE

BACKGROUND OF THE INVENTION

1. Field of the Invention

The present invention relates to pivoted blade barrel rotor wind turbines, and more particularly to pivoted blade barrel rotor wind turbines which operate at high wind power extraction efficiencies at blade speeds near the wind speed and thus are capable of operating well over a wide range of wind speeds at a constant rate of rotation.

2. Description of the Prior Art

Pivoted blade barrel rotor wind turbines have been proposed in the prior art. The proposed pivoted blade barrel rotor wind turbines of the prior art have generally fallen into one of two categories, viz., (1) large scale, complex devices which involve elaborate electrical or electronic control systems and do not teach how to achieve high wind power extraction efficiencies in small scale plants suited to individual farm, ranch, home, housing development, or apartment complex applications, especially where freedom from the cost and maintenance problems of electrical or electronic control systems is a principal design criterion, and (2) small scale, all-mechanical devices for individual farm, etc., use, which have not achieved or closely approached maximum wind power extraction efficiencies.

Other recent prior art wind turbine proposals and developments have involved techniques easily adapted from hardware developed in the aircraft and aerospace industries and have been generally characterized by the use of high speed, narrow, highly stressed rotors which can be expected to give rise to continuing high maintenance costs and other problems of the type met in helicopter operation. These recent prior art wind turbine proposals and developments do not appear to hold promise for solving the problem of obtaining maximum wind energy extraction in conditions of high wind shear and strong turbulence, nor showing to what extent it is useful to harness wind energy at sites where the prevailing wind velocities do not generally exceed 20 knots.

SUMMARY OF THE INVENTION

Accordingly, it is an object of the present invention to provide pivoted blade barrel rotor wind turbines which operate at high wind power extraction efficiencies over wide ranges of wind speed.

Another object of the present invention is to provide pivoted blade barrel rotor wind turbines which operate at high wind power extraction efficiencies over wide ranges of wind speed at constant rates of turbine rotation.

Yet another object of the present invention is to provide pivoted blade barrel rotor wind turbines which are of simple, all-mechanical construction and operate at high wind power extraction efficiencies at blade speeds near the wind speed.

A further object of the present invention is to provide pivoted blade barrel rotor wind turbines which operate at high wind power extraction efficiencies in conditions of high wind shear and strong turbulence.

A yet further object of the present invention is to provide pivoted blade barrel rotor wind turbines which operate at high wind power extraction efficiencies at sites where the average prevailing wind velocities do not in general exceed 20 knots.

A still further object of the present invention is to provide mechanical control means for controlling the angles of attack of the blades of such barrel rotor wind turbines in such manner as to achieve high wind power extraction efficiencies.

Yet another object of the present invention is to provide automatic low speed control means for such pivoted blade barrel rotor wind turbines for so controlling the angles of attack of the blades as to achieve maximum efficiencies at wind speeds so low that in constant turbine speed operation the turbine blades move at speeds greatly in excess of the wind speed.

An additional object of the present invention is to provide all-mechanical automatic shutdown means for automatically feathering the blades of such a pivoted blade barrel rotor wind turbine at a predetermined high turbine speed, and thus preventing run-away of the turbine.

Another object of the present invention is to provide simple mechanical means for use in such pivoted blade barrel rotor wind turbines to assure optimum blade angle of attack throughout each turbine rotation consistent with the avoidance of mechanical stresses of sufficient intensity to damage the turbine or significantly increase its frequency of maintenance and repair.

Yet another object of the present invention is to provide pivoted blade barrel rotor wind turbines which have good starting characteristics and will rotate and accelerate in very low winds.

Other objects of the present invention will in part be obvious and will in part appear hereinafter.

The present invention, accordingly, comprises the features of construction, combinations of elements, and arrangements of parts which will be exemplified in the constructions hereinafter set forth, and the scope of the invention will be indicated in the appended claims.

In accordance with a major aspect of the present invention a pivoted blade barrel rotor wind turbine having aerodynamic steering means mounted on each blade comprises deflecting means for alternately deflecting said steering means to one side of their associated blades and then the other and for causing said steering means to dwell on both sides of their associated blades for a substantial fraction of each deflection period.

In accordance with another major aspect of the present invention said deflecting means cause said steering means to pass rapidly through their neutral positions, i.e., the positions in which they lie in the chords of their associated blades, when passing from one side of their associated blades to the other.

In accordance with yet another aspect of the present invention said deflecting means include compound harmonic motion cams.

In accordance with a further aspect of the present invention said cams are face cams having first and second closed tracks, and the contour of each of said closed tracks includes a cuspate active portion, a non-singular active portion, and dwell portions between the active portions.

In accordance with a yet further aspect of the present invention said aerodynamic steering means are vanes which are pivotably mounted on said blades by means of pivoted arms, the pivoted arms being of such length that the leading edges of said vanes are remote from the trailing edges of said blades when said vanes pass through the chords of said blades in going from positive deflection to negative deflection with respect to said blades.

In accordance with yet another aspect of the present invention the aspect ratio of said blades is at least 2.

In accordance with a still further aspect of the present invention the plan form of said blades is substantially rectangular.

In accordance with an additional aspect of the present invention said deflecting means include toggle arms for operating said steering means and cam followers which follow said cam tracks and position said toggle arms in accordance with the contours of said cam tracks.

In accordance with another aspect of the present invention said deflecting means include transition cam profiles which cooperate with pins mounted on their associated face cams to positively impel their associated toggle arms through indeterminate portions of said cam tracks.

In accordance with yet another aspect of the present invention said blades are pivotably mounted between the outer ends of pairs of radius arms and the inner ends of all of the radius arms of said pairs are fixed to a rotatable mast, the upper and lower ends of said rotatable mast being journalled in anti-friction bearings.

In accordance with a further feature of the present invention the lower one of said bearings is fixed to the ground and the upper one of said bearings is fixed to a plurality of stays the outer ends of which are fixed to a plurality of struts or corner posts located outside the path of said blades, vanes, and radius arms.

In accordance with a yet further feature of the present invention said struts are supported by guys anchored to the ground and fixed to the tops of said struts, and the tops of said struts are interconnected by means of a second set of stays.

In accordance with another feature of the present invention said pivoted blade barrel rotor wind turbine includes deflection limiting means for selectively limiting the maximum deflection of said steering vanes and lost motion means for permitting said toggle cam means and toggle arms to continue oscillating when the deflection of said steering vanes is limited or entirely prevented by said deflection limiting means.

In accordance with a yet further feature of the present invention the pivoted blade barrel rotor wind turbine of the embodiment shown and described herein is provided with manually operable means for adjusting said deflection limiting means to selectively limit the maximum deflection of said steering vanes.

In accordance with another feature of the present invention the maximum deflection of said steering vanes may be made zero by said manually operable means, thus manually shutting down the wind turbine of the preferred embodiment.

In accordance with yet another feature of the present invention the wind turbine of the preferred embodiment is provided with automatic shutdown means for adjusting said deflection limiting means to progressively reduce the maximum deflection of said steering vanes over a range of high turbine speeds and ultimately reduce the maximum deflection limit to zero at the highest speed of said range, thus automatically shutting down the turbine of the preferred embodiment to prevent runaway.

In accordance with another aspect of the present invention the wind turbine of the preferred embodiment includes automatic control means for adjusting said deflection limiting means to reduce said maximum deflection when the tangential speed of said blades is substantially greater than the speed of the wind approaching the turbine and thus to optimize the solidity of the turbine rotor and maximize the efficiency of the turbine when the strength of the wind at the turbine is low.

For a fuller understanding of the nature and objects of the present invention reference should be had to the following detailed description, taken in connection with the accompanying drawings.

BRIEF DESCRIPTION OF THE DRAWINGS

FIG. 8 is a perspective view of one of the pivot blocks of the steering vane deflecting means of FIG. 7;

FIG. 9 is a plan view of the pivot block of FIG. 8;

FIG. 10 is a perspective view of one of the pivot blocks of the steering vane deflecting means of FIG. 7;

FIG. 11 is a plan view of the pivot block of FIG. 10;

FIG. 13 is a fragmentary view of the rotary mast of the pivoted blade barrel rotor wind turbine of FIG. 1 and one of the overspeed control means of that wind turbine;

FIG. 14 is a fragmentary vertical sectional view taken on line 14—14 of FIG. 13;

FIG. 19 is a vertical sectional view of the low wind control of the pivoted blade barrel rotor wind turbine of FIG. 1; and FIG. 20 is a plan view of an alternative cam toggle mechanism which may be used in certain embodiments of the present invention.

DESCRIPTION OF THE PREFERRED EMBODIMENT

Figure 1:
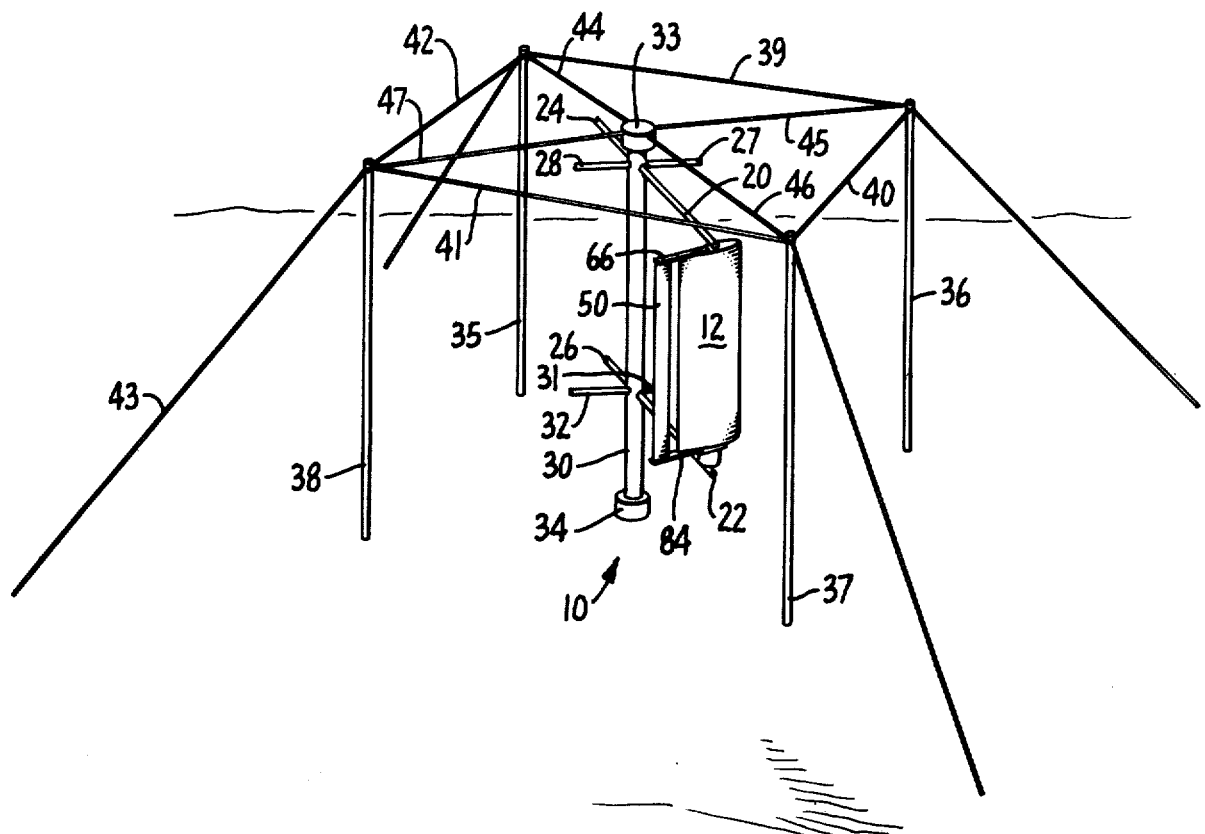
FIG. 1 is a fragmentary perspective view of a pivoted blade barrel rotor wind turbine embodying several aspects and features of the present invention.

Referring now to FIG. 1, there is shown a perspective view, partially cut away, of a pivoted blade barrel rotor wind turbine constructed in accordance with a preferred embodiment of the present invention.

The pivoted blade barrel rotor wind turbine of FIG. 1 comprises a rotor 10 (shown in part only for clarity of illustration) and its associated support structure by means of which it is supported and journalled for rotation about a vertical axis in response to the prevailing winds at its location.

The means used for mechanically coupling rotor 10 to an output device such as an alternator are not part of the present invention and will not be shown and described herein, since the provision of such coupling means lies within the scope of one having ordinary skill in the art.

Figure 2:
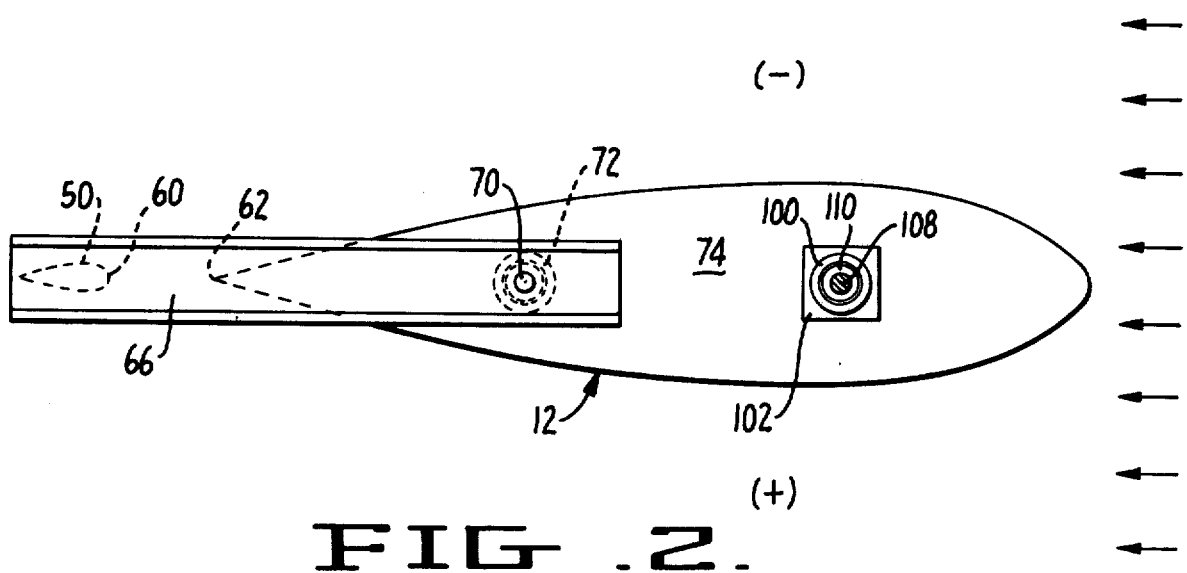
FIG. 2 is a plan view of one of the blade and vane assemblies of the pivoted blade barrel rotor wind turbine of FIG. 1.

As may be seen by comparison of FIGS. 1 and 2, rotor 10 comprises a vertically disposed blade or airfoil 12 having the cross-sectional (horizontal) shape of a zero mean camber airfoil, i.e., an airfoil which is symmetrical about its chord. As may also be seen from FIG. 1, the aspect ratio, i.e., span/mean chord ratio, of airfoil 12 is about 3.5, and its plan form is rectangular.

Rotor 10 further comprises three additional vertically disposed blades or airfoils 14, 16, 18 (not shown) which are substantially identical to blade 12. Each blade or airfoil is pivotably mounted between a pair of support arms or radius arms. E.g., blade 12 is pivotably mounted between radius arms 20 and 22, blade 14 is pivotably mounted between radius arms 28 and 32, and blade 16 is pivotably mounted between radius arms 24 and 26 (shown in part only). Radius arms 20 and 24, and the other two upper radius arms 27, 28 (also shown in part only) are affixed at their inner ends to a tubular mast 30. Radius arms 22 and 26 and the other two lower radius arms 31, 32 (also shown in part only) are affixed at their inner ends to mast 30. Mast 30 is rotatably mounted in a bearing assembly 33 located at its upper end and a bearing assembly 34 located at its lower end, all as seen in FIG. 1.

As further seen in FIG. 1, upper mast bearing 33 is supported and maintained in position by means of four corner posts 35, 36, 37, 38 and associated guys and stays or tension cables. In accordance with the teachings of the present invention corner posts 35, 36, 37, 38 are vertically mounted in the earth in suitable footings located at the corners of a square centered on mast 30. The tops of struts or corner posts 35, 36, 37, 38 lie substantially in the same horizontal plane and are interconnected by horizontal stays or tension cables 39, 40, 41, 42. As also seen in FIG. 1, corner post 38 is provided with a guy wire or cable 43. The upper end of guy 43 is attached to the upper end of strut 38 and the lower end of guy 43 is anchored to the ground by anchoring means of the type well known to those having ordinary skill in the art. Guy 43 may also be provided with suitable tensioning means, such as a turnbuckle. The anchor at the lower end of guy 43 is preferably so located that guy 43 lies in a vertical plane containing corner posts 36 and 38. As further seen in FIG. 1, each of the corner posts 35, 36, 37 is provided with a guy similar to guy 43.

Upper mast bearing 33 is suspended from struts 35, 36, 37, 38 by means of four stays 44, 45, 46, 47 (FIG. 1). The inner end of each of the diagonal stays or tension cables 44, 45, 46, 47 is affixed to the outer ring of bearing 33. The outer end of each diagonal stay 44, 45, 46, 47 is affixed to the upper end of an associated strut. E.g., the outer end of diagonal stay 44 is affixed to the upper end of strut 35 by conventional means, stay 45 is similarly affixed to the upper end of strut 36, etc.

Bearing 34 is mounted on the ground directly below and in vertical alignment with bearing 33 by means of a footing of conventional type.

The vertically-journalled rotating mast arrangement of FIG. 1 constitutes a principal feature of the present invention, but the present invention is not limited to wind turbines incorporating such an arrangement.

Each of the blades 12, 14, 16, 18 is pivotably mounted between the extremities of its associated radius arms for continuous pivoting as rotor 10 is turned by the action of the prevailing winds. The pivot axis of each blade 12, 14, 16, 18 intersects its central cross section at a point slightly ahead of the center of lift in that cross section.

As further shown in FIG. 1, a steering vane 50 is mounted on blade 12. Blades 14, 16, and 18 are similarly provided with steering vanes 52, 54, and 56, respectively (not shown). The construction of these steering vanes and the manner of their mounting on and coaction with their associated blades will be described hereinafter.

Referring now to FIG. 2, it will be seen that the leading edge 60 of steering vane 50 is spaced from the trailing edge 62 of blade 12 by a considerable distance, e.g., by a distance approximating the chordal length of vane 50. It is to be understood that the use of a separate, remotely located vane rather than an integrated element of the kind sometimes called a "flap" or "tap" to determine the angle of attack of a blade of a pivoted blade barrel rotor wind turbine is an important feature of the present invention. The present invention is not, however, limited to any particular spacing between the leading edge of a blade steering vane and the trailing edge of its associated blade, nor to the employment of a separate, remotely located vane, or any other particular aerodynamic airfoil orienting means.

It is also to be understood that in the preferred embodiment each of the vanes 50, 52, 54, 56 is spaced from its associated blade by approximately the same distance. Thus, the leading edge of vane 52 is spaced from the trailing edge of blade 14 by about one chordal length of vane 52, the leading edge of vane 54 is spaced from the trailing edge of blade 16 by about one chordal length of vane 54, etc. Further, all four blades are substantially alike in construction and dimensions, and all four steering vanes are substantially alike in construction and dimensions. Each blade-vane pair is mass-balanced about the blade pivot axis, for example, by a heavy member in the leading edge of each blade, and each vane is similarly mass-balanced about its pivot axis.

As may be seen in FIG. 2, the upper end of steering vane 50 is pivotably mounted on blade 12 by means of a vane support arm 66 and a pivot rod 70. Pivot rod 70 is fixed in the inner ring of anti-friction bearing 72, which is itself fixedly mounted in the upper rib or former 74 of blade 12. The support arm for pivotably supporting the lower end of steering vane 50 is described hereinbelow.

In the preferred embodiment, both the blades 12, 14, 16, 18 and the steering vanes 50, 52, 54, 56 may be of conventional rib-and-spar construction characteristically found in light aircraft, utilizing plywood for the structural members and sheet metal for the covering, which is made possible by the less pressing weight problem in the wind turbine of the present invention.

Figure 3:
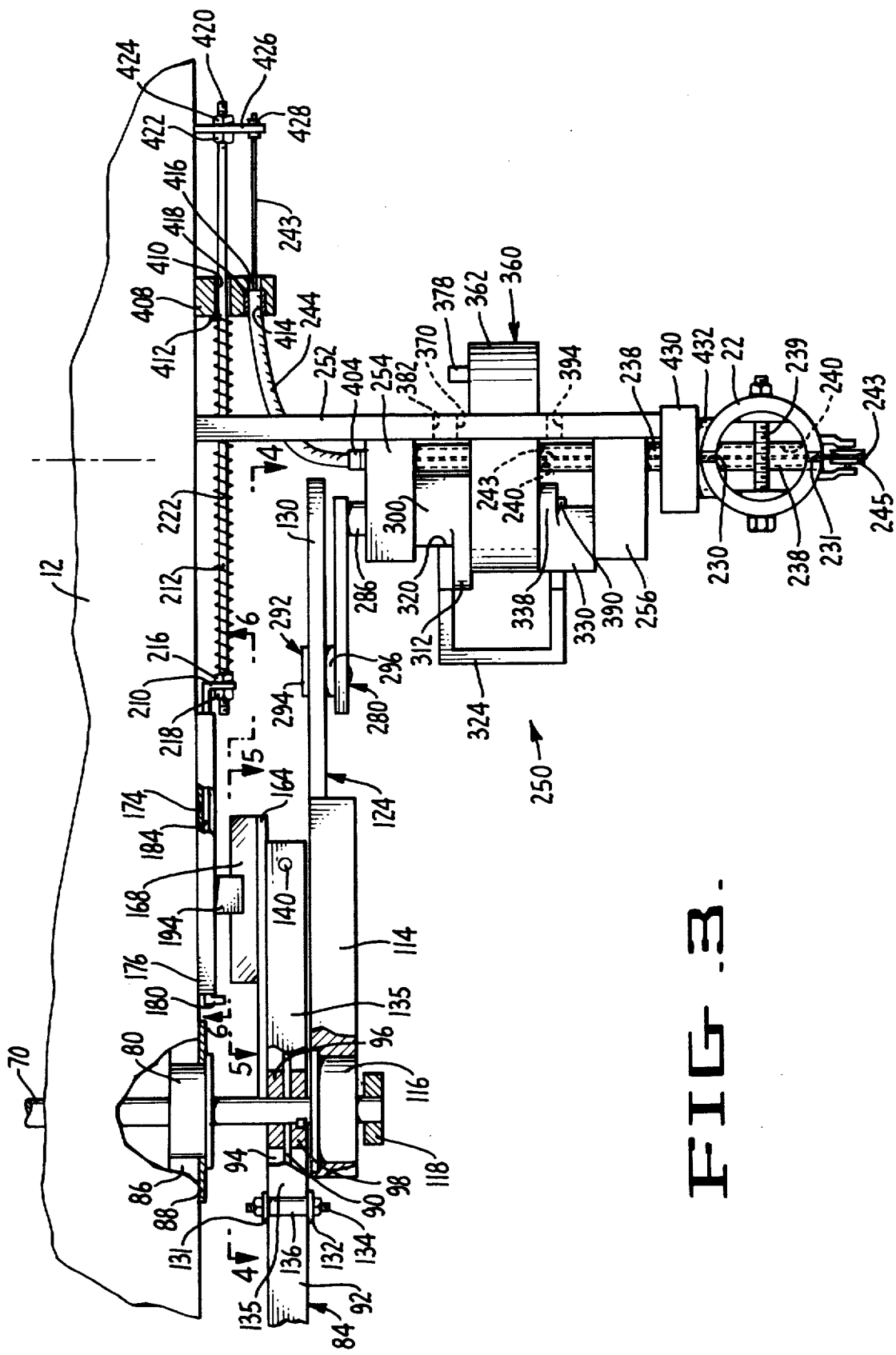
FIG. 3 is an enlarged fragmentary vertical sectional view of the one of the steering vane deflecting means of the pivoted blade barrel rotor wind turbine of FIG. 1 and the blade and radius arm between which this steering vane deflecting means is mounted.

Comparing FIG. 2 which shows the upper end of blade 12 in plan view with FIG. 3 which shows the lower end of blade 12 in elevation it will be seen that pivot rod 70 extends from top to bottom of blade 12, and beyond. At its upper end (FIG. 2) pivot rod 70 passes through bearing 72, in the inner ring of which it is fixed, and then is fixed to vane support arm 66. At its lower end (FIG. 3) pivot rod 70 passes through an anti-friction bearing 80, and then is affixed to the lower vane support arm 84. As may also be seen in FIG. 3, bearing 80 is fixedly mounted in the lowest rib 86 of blade 12, as by means of a mounting plate 88. Pivot rod 70 is fixedly mounted in the inner ring of anti-friction bearing 80. (While the anti-friction bearings employed in the preferred embodiment are generally illustrated herein as ball bearings for simplicity of illustration it will be understood by those having ordinary skill in the art that where appropriate because of shock or impact loading roller bearings, particularly those having combined radial and thrust bearing properties, may be substituted by those having ordinary skill in the art without departing from the present invention.)

As shown in FIG. 3, lower vane support arm 84 is of generally I-shaped cross section, comprising a central web 90 and two flanges 92, 94. Upper vane support arm 66 is of similar, generally I-shaped construction in the preferred embodiment. Pivot rod 70 is rigidly affixed to the web of lower support arm 84, as by means of blocks 96, 98 and suitable associated fastening means. The upper end of pivot rod 70 (FIG. 2) is similarly rigidly affixed to upper vane support arm 66.

The upper end of vane 50 is buttedly affixed to upper vane support arm 66 as indicated in FIG. 2. Similarly, the lower end of vane 50 is buttedly affixed to lower vane support arm 84.

Thus, it will be apparent to those having ordinary skill in the art, informed by the present disclosure, that vane 50 is pivotably affixed to blade 12 for pivoting about the axis of pivot rod 70 and bearings 72 and 80, all of which are coaxial with the aforesaid vane pivot axis, pivot rod 70 extending longitudinally through the interior of blade 12. Vanes 52, 54, and 56 are similarly mounted on blades 14, 16, and 18, respectively, for pivoting about their respective pivot axes. It will also be apparent that, being thus pivoted, vane 50 can be deflected to either side of the chord of blade 12, vane 52 can be deflected to either side of the chord of blade 14, etc. A deflection of any vane to the right side of the chord of its associated blade, as seen from directly behind the associated blade, is arbitrarily designated as a positive vane deflection herein, and similarly, a leftward deflection of any vane with respect to its associated blade is arbitrarily designated as a negative vane deflection herein.

Referring again to FIG. 2, it will be seen that an anti-friction bearing 100 is mounted on a mounting plate 102, and that mounting plate 102 is itself affixed to upper rib 74 of blade 12. A pivot rod 108 is affixed to inner ring 110 of bearing 100 by conventional means which do not constitute a part of the present invention. The upper end of pivot rod 108 is fixed in a suitable close-fitting opening in the outer end of radius arm 20 (FIG. 1), and thus the upper end of blade 12 is pivotably mounted on the outer end of radius arm 20 for continuous, unlimited rotation with respect to radius arm 20 about the aforesaid blade pivot axis. A mounting plate similar to mounting plate 102 and similarly located is affixed to at least the upper rib of each of the blades 14, 16, and 18. A bearing similar to blade pivot bearing or airfoil pivot bearing 100 is affixed to each of said mounting plates. A pivot rod similar to pivot rod 108 is fixed in the inner ring of each of said similar bearings. The upper end of the pivot rod thus pivotably affixed to blade 14 is fixed in a suitable close-fitting opening in the outer end of radius arm 28, and thus the upper end of blade 14 is pivotably mounted on the outer end of radius arm 28 for continuous, unlimited rotation with respect to radius arm 28. The upper ends of blades 16 and 18 are similarly pivotably mounted for continuous, unlimited rotation with respect to their associated upper radius arms about their respective pivot axes.

Referring again to FIG. 3, it will be seen that steering vane pivot rod 70 extends downwardly beyond vane support arm 84, and that a short arm 114, called herein the "fork arm," is pivotably mounted on the projecting portion of pivot rod 70 by means of an anti-friction bearing 116. It will further be seen in FIG. 3 that a hub 118 is affixed to the lower extremity of pivot rod 70.

Figure 4:
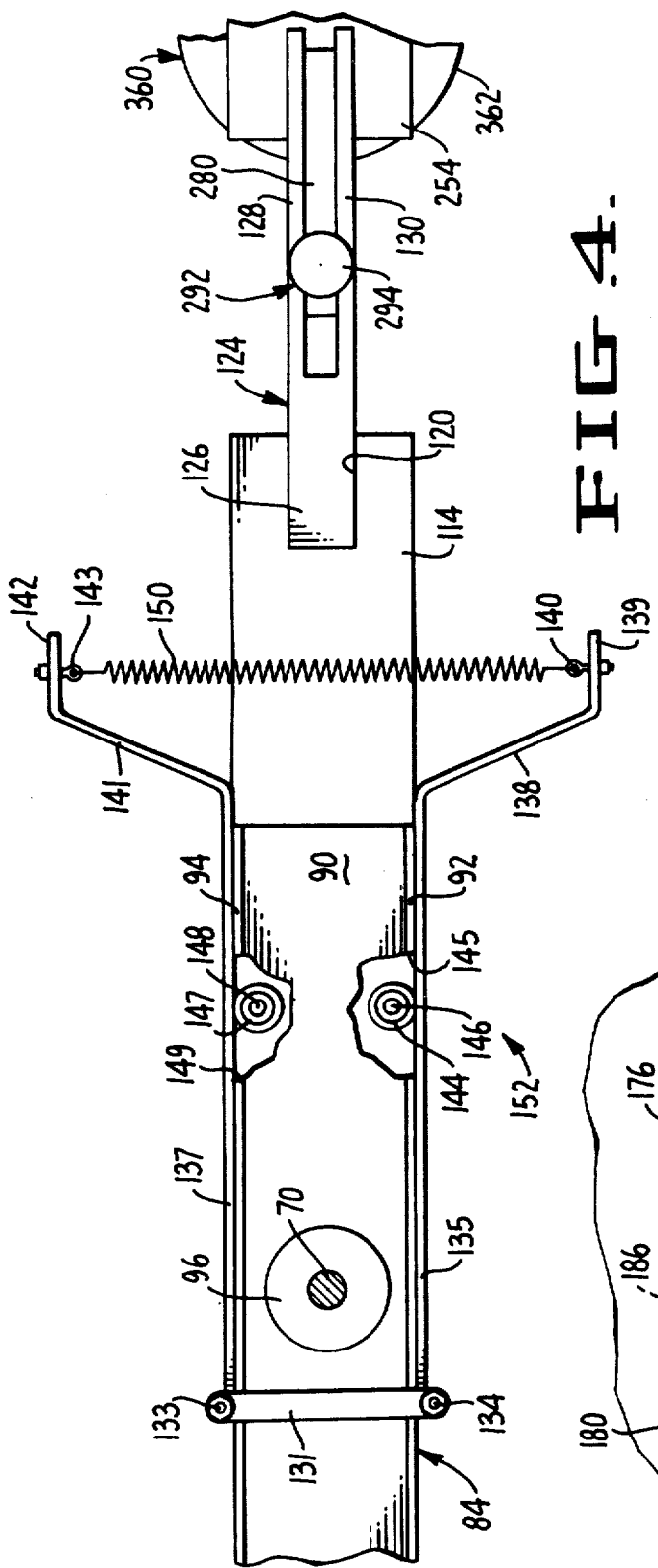
FIG. 4 is a fragmentary sectional view taken on line 4—4 of FIG. 3 showing the lost motion means by which one of the vanes of the pivoted blade barrel rotor wind turbine of FIG. 1 is coupled to its associated deflecting means.

Referring now to FIG. 4, and comparing it with FIG. 3, it will be seen that the upper face of fork arm 114 is provided with a recess 120 adapted to receive one end of a fork-shaped member 124. Fork-shaped member 124 is called the "fork" herein. Fork 124 comprises a shank 126 and two tines 128, 130 projecting therefrom. Shank 126 is close-fittingly received in recess 120 and secured therein by suitable fastening means of the type which will be provided by those having ordinary skill in the art without the exercise of invention.

Comparing FIGS. 3 and 4, it will be seen that a cross-member 131 is disposed perpendicular to the flanges 92, 94 of vane support arm 84, and extends beyond both of those flanges. Cross-member 131 is affixed to the top edges of said flanges. Similarly, a cross-member 132 is disposed perpendicular to flanges 92 and 94, projects beyond flanges 92 and 94, and is affixed to the lower edges of said flanges.

A hinge pin 133 (FIG. 4) extends between the portions of cross-members 131 and 132 which extend beyond flange 94. Hinge pin 133 passes through close-fitting holes in cross-members 131 and 132, and its ends are retained in those holes by means, for instance, of nuts engaged with threads tapped in projecting end portions of hinge pin 133.

A hinge pin 134 (FIGS. 3 and 4) extends between the portions of cross-members 131 and 132 which extend beyond flange 92. Hinge pin 134 passes through close-fitting holes in cross-members 131 and 132, and its ends are retained in those holes by means, for instance, of nuts engaged with threads tapped in projecting end portions of hinge pin 134.

A flat metal arm 135 (FIGS. 3 and 4) is provided with a rolled portion 136 at one end. Hinge pin 134 passes through rolled portion 136, and thus arm 135 is pivotably mounted on vane support arm 84. It is to be noted, however, that arm 135 merely lies in contact with flange 92 of vane support arm 84, as seen in FIG. 4, and is not affixed to vane support arm 84 except by means of hinge pin 134, etc., as described immediately above.

Referring again to FIG. 4, it will be seen that an arm 137 similar to arm 135 but reversed with respect thereto in the mirror image sense is pivotably mounted on hinge pin 133. Arm 137 is affixed to vane support arm 84 only by means of hinge pin 133, etc.

The end of arm 135 remote from hinge pin 134 is bent to form an angulated portion 138 (FIG. 4) and a parallel portion 139 (FIG. 4). Parallel portion 139 is provided with an inwardly projecting eye 140. Similarly, the end of arm 137 remote from hinge pin 133 is bent to form an angulated portion 141 and a parallel portion 142, and parallel portion 142 is provided with an inwardly projecting eye 143.

Referring to FIG. 4, it will be seen that a ball bearing wheel or roller 144 projects through an opening 145 in flange 92 and bears against the inner face of arm 135. The inner ring of ball bearing wheel 144 is affixed to a spindle 146. Spindle 146 is affixed to the upper surface of fork arm 114. Similarly, a ball bearing wheel 147 is affixed to a spindle 148 and projects through an opening 149 in flange 94 to bear against the inner face of arm 137. Spindle 148 is affixed to the upper surface of fork arm 114.

As also seen in FIG. 4, a coil spring 150 is fastened to both eye 140 and eye 143.

As will now be evident to those having ordinary skill in the art, informed by the present disclosure, the above-described arrangement of arms 135 and 137, roller bearing wheels 144 and 147, coil spring 150, etc., provides a spring-loaded lost motion coupling between vane support arm 84 and fork arm 114. This spring-loaded lost motion coupling arrangement may sometimes be referred to herein as lost motion coupling 152.

Figure 5:
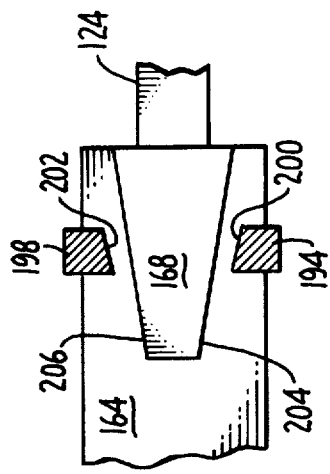
FIG. 5 is a fragmentary sectional view taken on line 5—5 of FIG. 3.

Referring now to FIG. 5, and comparing it with FIG. 3, it will be seen that a plate 164 is affixed to the top edges of flanges 92 and 94 of vane support arm 84, and projects beyond the end of vane support arm 84 to a point beyond the outer ends of arms 135 and 137. It will also be seen that a wedge-shaped block 168 is affixed to the top of plate 164, with the large end of wedge-shaped block 168 lying along the outer (right-hand) end of plate 164. Wedge-shaped block 168 will sometimes be called the "wedge" herein.

Figure 6:
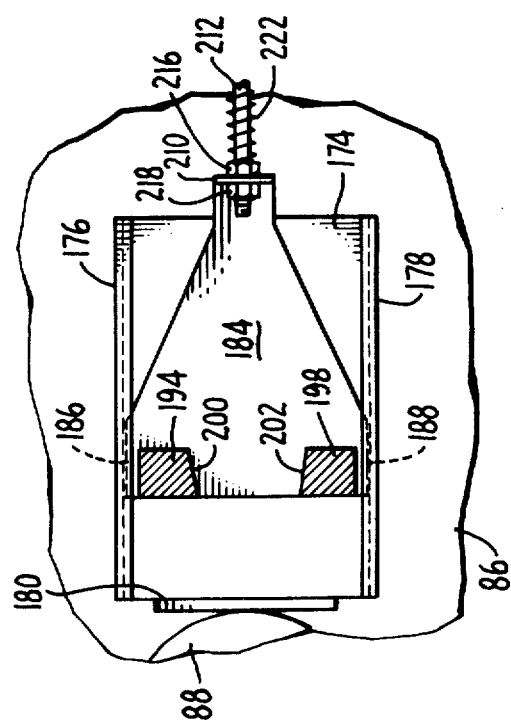
FIG. 6 is a fragmentary sectional view taken on line 6—6 of FIG. 3.

Referring now to FIG. 6, and comparing it with FIG. 3, it will be seen that a plate 174 is affixed to the lower surface of the lowest rib 86 of blade 12. It will also be seen that the two longest edges of plate 174 are overturned to form channels 176 and 178. Further, it will be seen that an ear projecting from one of the smaller edges of plate 174 is upturned to provide a flange 180.

A moveable plate 184 (FIG. 6) is provided with short, straight, parallel edges 186 and 188. Edge 186 is engaged in channel 176 and edge 188 is engaged in channel 178, and thus plate 184 is maintained in contact with plate 174 and is constrained to move along a single straight path as it is moved with respect to plate 174.

A pair of blocks 194 and 198 are affixed to the surface of plate 184 which is not in contact with plate 174. Blocks 194 and 198 will sometimes be called "stops" or "limit stops" herein.

As seen in FIGS. 5 and 6, stops 194 and 198 are provided, respectively, with angulated surfaces 200 and 202. Surfaces 200 and 202 are substantially parallel to the adjacent surfaces 204 and 206, respectively, of wedge 168 (FIG. 5).

As may be seen by comparing FIGS. 3 and 5, wedge 168 is located between stops 194 and 198. Further, the distances between wedge 168 and stops 194 and 198 are decreased when stops 194 and 198 are moved rightwardly as seen in FIGS. 3 and 5, and are increased when stops 194 and 198 are moved leftwardly as seen in FIGS. 3 and 5. As explained above, wedge 168 is affixed to vane support arm 84, and stops 194 and 198 are constrained to move in a straight path parallel to the plane of FIG. 3 along bottom rib 86 of blade 12. It follows, then, that the maximum angular extent to which vane 50 can be deflected from the plane of symmetry or chord of blade 12 varies in accordance with the position of plate 184 (FIG. 6), i.e., with the position of stops 194 and 198. At one extreme of their movement stops 194 and 198 contact wedge 168 and thus prevent vane 50 from being deflected at all. In this state of operation blade 12 is said to be "feathered." For this reason the stops 194, 198 and the parts cooperating therewith as seen in FIGS. 3, 5, and 6 are sometimes called "deflection limiting means" herein.

Referring again to FIG. 6 it will be seen that a part of the projecting tongue at the narrow end of plate 184 is upturned to provide a flange 210. A threaded rod 212 passes through a suitable close-fitting opening in flange 210. One end of rod 212 is retained in said suitable close-fitting opening by means of a coacting pair of nuts 216, 218. A coil spring 222 surrounds rod 212, and one end of coil spring 222 is affixed to flange 210, as by being trapped between flange 210 and nut 216. The means for operating rod 212 to suitably position plate 184 and thus to suitably position stops 194 and 198 will be described in detail hereinbelow.

Referring again to FIG. 3, there is shown the outer end of radius arm 22 (see FIG. 1). The outer end of radius arm 22 is split by cuts 230, 231. Cuts 230, 231 end in coaxial circular bores 232, 233 (not shown). A pivot rod 238 is close-fittingly received in bores 232 and 233 and retained therein by the clamping action of a transverse bolt, etc., 239. Bores 232, 233 are so located and oriented that pivot rod 238 is coaxial with pivot rod 108 (FIG. 2), radius arm 22 and radius arm 20 being maintained in vertical alignment as explained above.

As also shown in FIG. 3, a bore 240 extends from end to end of pivot rod 238. The central wire 243 of a Bowden cable 244 passes through bore 240 and projects from both ends thereof. The central wire 243 of Bowden cable 244 projects from the bottom of radius arm 22 and passes under pulley 245, mounted on radius arm 22 as seen in FIG. 3. The function of Bowden cable 244 will be described in detail hereinafter.

Pivot rod 238 is a part of a cam toggle mechanism 250 which is a principal feature of the present invention. The particular novel constructional features of cam toggle mechanism 250 of the preferred embodiment will now be described in detail with reference to FIGS. 3 and 7.

Referring particularly to FIG. 3, it will be seen that cam toggle mechanism 250 is mounted on a plate 252. Plate 252 is itself rigidly mounted on the lower rib 86 of blade 12. It is to be understood that plate 252 may be securely affixed to or be an integral part of a spar of blade 12 or may extend into blade 12 and be securely affixed to several formers thereof, all within the scope of the present invention.

Figure 7:
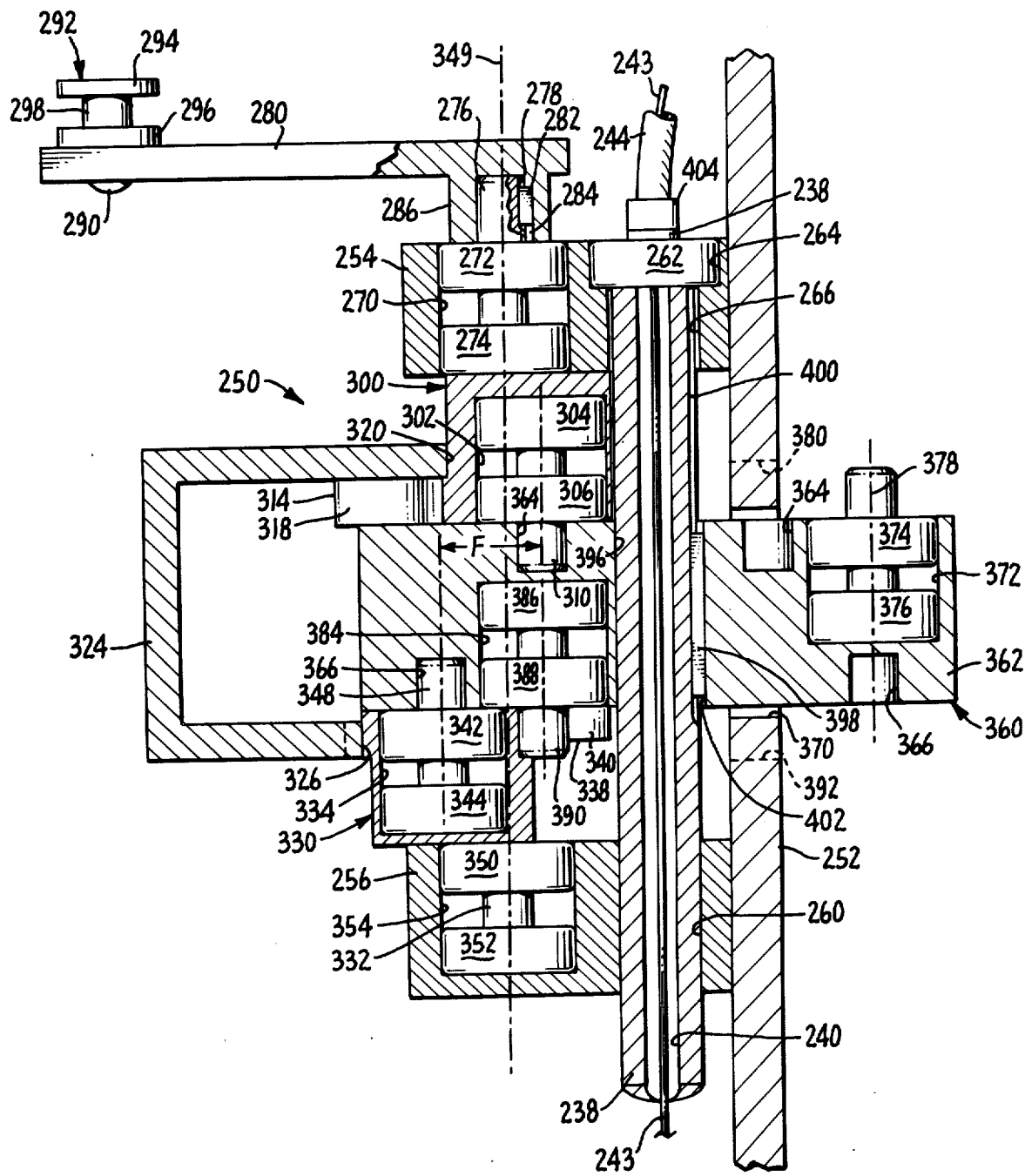
FIG. 7 is a fragmentary vertical sectional view of one of the cam toggle mechanisms of the pivoted blade barrel rotor wind turbine of FIG. 1.

Comparing FIGS. 3 and 7, it will be seen that an upper bearing block 254 and a lower bearing block 256 are both securely affixed to mounting plate 252, as by means of suitable bolts or machine screws.

As best seen in FIG. 7, pivot rod 238 passes through a bore 260 in bearing block 256. Bore 260 may be bored or reamed to a running fit with pivot rod 238, and thus may serve as a journal bearing for pivot rod 238. An anti-friction bearing between bearing block 256 and pivot rod 238 may be provided by one having ordinary skill in the art without departing from the present invention.

The upper end of pivot rod 238 is received in an anti-friction bearing 262, which itself is received in a bore 264 in bearing block 254. The upper end of pivot rod 238 is received in and affixed to the inner ring of anti-friction bearing 262. In the preferred embodiment it may be desirable to employ a combination radial and thrust bearing as bearing 262. The lower bore 266 in bearing block 254 will preferably be a clearance hole for pivot rod 238. In addition, bearing block 254 is provided with a second bore 270 (FIG. 7). A pair of anti-friction bearings 272, 274 are disposed in bore 270, their outer rings being secured to the wall of bore 270 in a manner well known in the art. A stub shaft 276 passes through both of these anti-friction bearings 272 and 274 and is affixed to the inner rings of both of these anti-friction bearings. Stub shaft 276 is provided with a keyway 278 at its outer end. An arm 280, called herein the "toggle arm," is affixed to the outer end of stub shaft 276 for conjoint rotation therewith by means of a key 282 engaged in keyway 278 and a keyway 284 in the boss portion 286 of toggle arm 280.

The outer end of toggle arm 280 is provided with a bore adapted for receiving a bolt 290. Bolt 290 serves to rotatably affix a knob 292 to toggle arm 280. Knob 292 is preferably fabricated from a self-lubricating material, and comprises a pair of circular flanges 294, 296 joined by an integral, cylindrical intermediate member 298.

As may be seen by comparison of FIGS. 3 and 4, knob 292 is engaged in fork 124, the intermediate portion 298 being received in the space between tines 128 and 130, and tines 128 and 130 lying between flanges 294 and 296. Thus, it will be seen that the angle between the chord of vane 50 and the chord of blade 12 is controlled by the angular position of toggle arm 280 about the axis of stub shaft 276.

As may be seen by comparing FIGS. 7, 8, and 9, stub shaft 276 projects from and is integral with a pivot block 300, sometimes called herein the "upper pivot." Upper pivot 300 is provided with a bore 302 which serves as a bearing well for receiving and retaining a pair of anti-friction bearings 304 and 306 (FIG. 7). The outer rings of bearings 304 and 306 are affixed to the wall of bore 302 in a well-known manner. A cylindrical pin 310 passes through bearings 304 and 306, and is affixed to their inner rings in a well-known manner. The function of pin 310 will be described in detail hereinafter. It suffices to say at this point that pin 310 follows a cam track and thus may sometimes be called a "follower" or "follower pin" herein.

As best seen in FIGS. 8 and 9, upper pivot 300 is provided with a pair of arms 312, 314. The inner faces of arms 312 and 314 together define a cam profile 318. The function of cam profile 318 will be described in detail hereinafter. Profile 318 will sometimes be called a "transition cam" hereinafter, because it serves to impel the toggle assembly arm 280, etc., through an indeterminate point of the toggle cam of cam toggle mechanism 250.

Immediately above arms 312 and 314, as seen in FIG. 7, upper pivot 300 is provided with a flat face 320. It is also to be noted that pivot 300 is provided with a curved rear face 322. The reason for providing curved rear face 322 will become apparent hereinafter.

As shown in FIGS. 3 and 7, a yoke 324 is affixed to flat face 320 of pivot 300, as by means of machine screws passing through suitable clearance holes and engaging threads in suitable tapped holes.

The lower end of yoke 324 is similarly affixed to a face 326 of a lower pivot block 330. Lower pivot or pivot block 330 is illustrated in detail in FIGS. 10 and 11. As there seen, pivot block 330 is provided with a stub shaft 332. Lower pivot 330 is also provided with a bearing well 334, and a pair of arms 336, 338. The inner surfaces of arms 336 and 338 together define a cam profile 340. The function of cam profile 340 will be described in detail hereinafter. Profile 340 will sometimes be called a "transition cam" hereinafter, because it serves to impel toggle arm 280, etc., through an indeterminate point of the toggle cam of cam toggle mechanism 250.

As seen in FIG. 7, a pair of anti-friction bearings 342, 244 are received and retained in bearing well 334, the outer rings of bearings 342 and 344 being affixed to the wall of bearing well 334 by well-known means. A cylindrical pin 348 passes through bearings 342 and 344 and is affixed to the inner rings of those bearings by well-known means. The function of pin 348 will be described in detail hereinafter.

The common axis 349 (FIG. 7) of stub shafts 276 and 332 will sometimes be called the "toggle pivot axis" herein.

As best seen in FIG. 7, the stub shaft 332 of lower pivot 330 passes through two anti-friction bearings 350, 352. Stub shaft 332 is affixed to the inner rings of bearings 350 and 352 by well-known means. Bearings 350 and 352 are received and retained in a bearing well 354 in bearing block 256.

It will thus be apparent to those having ordinary skill in the art, informed by the immediately preceding disclosure, that pivots 300 and 330, toggle arm 280, and yoke 324 together form a unitary assembly which is pivotably mounted in bearing blocks 254 and 256 by means of anti-friction bearings 272, 274, 350, and 352. This unitary assembly will sometimes be called the "toggle assembly" or "toggle" herein and will be referred to by the reference numeral 358. It follows that pins 310 and 348 are rigidly maintained at a fixed distance apart ("F," FIG. 7) throughout the operation of the barrel rotor wind turbine of the present invention.

The other major part of cam toggle mechanism 250 is the toggle cam 360. As may be seen by comparing FIGS. 3, 4, and 7, toggle cam 360 comprises a thick, generally circular disc 362. Disc 362 is shown in detail in FIG. 12. As there seen, disc 362 is provided with an upper, continuous cam track 364 and a lower, continuous cam track 366. The width of cam track 364 is such as to close-fittingly receive follower pin 310 (FIG. 7) and permit follower pin 310 to continuously, uninterruptedly traverse cam track 364 completely and repeatedly as the turbine of the present invention is continuously rotated by the prevailing winds acting upon it. Similarly, the width of cam track 366 is such as to close-fittingly receive follower pin 348 (FIG. 7) and permit follower pin 348 to continuously, uninterruptedly traverse cam track 366 completely and repeatedly as the turbine of the present invention is continuously rotated by the prevailing winds acting upon it.

Figure 12:
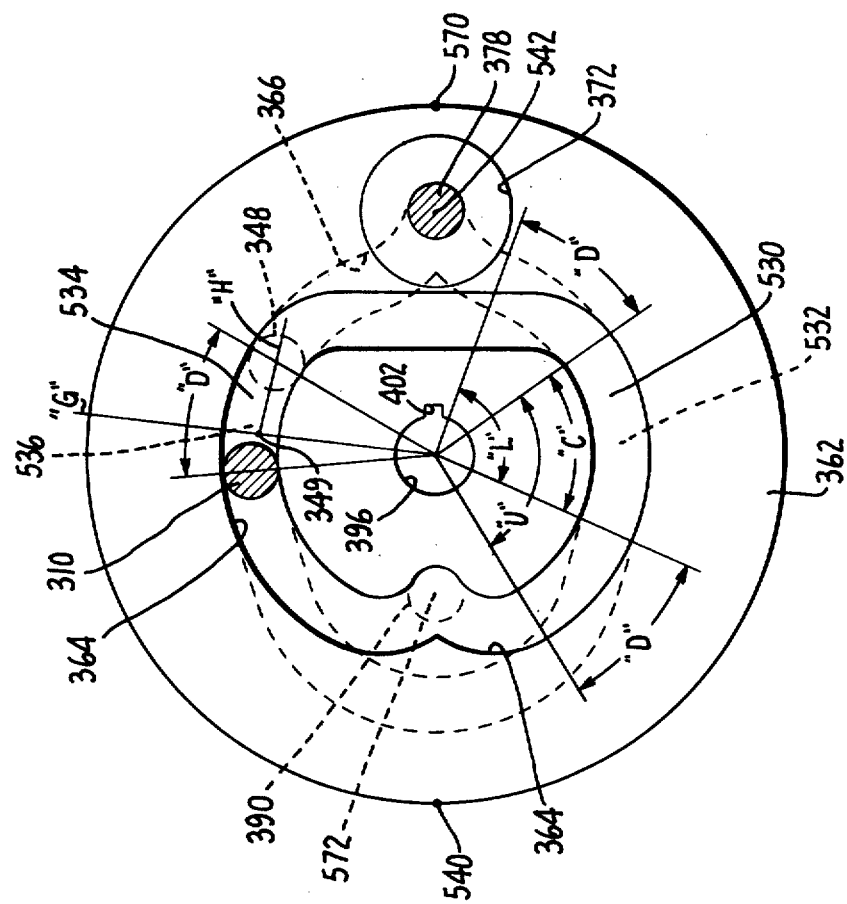
FIG. 12 is a plan view of the face cam or toggle cam of one of the steering vane deflecting means of the pivoted blade rotor wind turbine of FIG. 1.
Figure 12A:
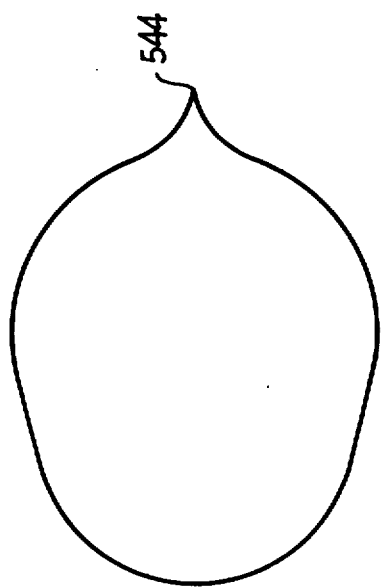
FIG. 12A is a schematic view of the path traced by the axis of a milling cutter in cutting the lower track of the face cam or toggle cam of FIG. 12.
Figure 12B:
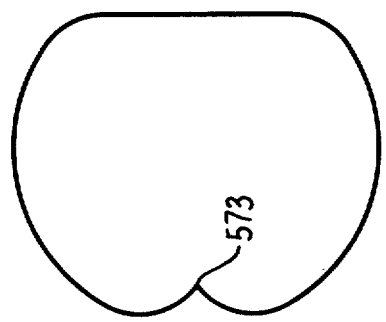
FIG. 12B is a schematic view of the path followed by the axis of a milling cutter in cutting the upper track of the cam of FIG. 12.

The path followed by the axis of a ⅛ inch milling cutter in cutting cam track 366, i.e., the contour of cam track 366, is shown in FIG. 12A. The path followed by the axis of a ⅛ inch milling cutter in cutting cam track 364, i.e., the contour of cam track 364, is shown in FIG. 12B.

Returning now to FIG. 12 and considering only the lower half thereof, it will be seen that throughout an angle "C" defined by two planes which intersect along the axis of cam disc 362 cam track 364 directly overlies cam track 366, and that throughout angle "C" both cam track 364 and cam track 366 are of circular contour. These common radius, circular, mutually overlying portions of cam tracks 364 and 366 may sometimes be called the "right-hand 'C'" or "CR" portions of those cam tracks. Also, as will be obvious from the symmetry of cam disc 362 about a plane containing its axis and the cusps of cam tracks 364 and 366, the cam tracks have corresponding common radius, circular, mutually overlying "left-hand 'C'" or "CL" portions.

It will also be evident from FIG. 12 that the lower half of upper cam track 364 is not only circular in contour throughout angle "C" but is also circular in contour throughout an angle "D" which is located directly to the left of angle "C" in FIG. 12 and is coterminous therewith. Thus, the complete circular portion of the lower half of upper cam track 364 (FIG. 12) extends throughout an angle "U". That portion of the lower half of upper cam track 364 may sometimes be called the "right-hand circular portion," or "UR" portion, of upper cam track 364 herein.

As will also be obvious from the symmetry of cam disc 362 about a plane containing its axis and the cusps of cam tracks 364 and 366, cam track 364 also has a "left-hand circular portion" or "UL" portion of the same angular extent as the "UR" portion thereof.

As may also be seen by inspection of FIG. 12, the lower half of lower cam track 366 is not only circular in contour throughout angle "C" but is also circular in contour throughout an angle "D" which is located directly to the right of angle "C" in FIG. 12 and is coterminous therewith. Thus, the complete circular portion of the lower half of lower cam track 366 (FIG. 12) extends throughout an angle "L". By convention adopted herein, that portion of the lower half of lower cam track 366 will sometimes be called the "right-hand circular portion," or "LR" portion, of lower cam track 366 herein.

As will be obvious from the symmetry of cam disc 362 about a plane containing its axis and the cusps of cam tracks 364 and 366, lower cam track 366 also has a "left-hand circular portion," or "LL" portion, of the same angular extent as the "LR" portion thereof.

It will also be evident from FIG. 12 that the displacement angle "D" between the "UR" and "LR" and the "UL" and "LL" portions of cam tracks 364 and 366 is equal to the angle subtended at the axis of cam disc 362 by the axes of the follower pins 310 and 348 (FIG. 7) when they are both traversing circular portions of their respective cam tracks.

As best seen in FIG. 7, an opening 370 is provided in mounting plate 252 to accommodate toggle cam 360.

As also seen in FIG. 7, a well 372 is provided in the upper surface of cam disc 362. A pair of anti-friction bearings 374, 376 are received in well 372 and retained therein by well-known means. A cylindrical pin 378 passes through bearings 374 and 376 and is affixed to the inner rings of both of those bearings in a well-known manner. Opening 370 is provided with two outwardly directed arm portions 380, 382 which are sufficiently large in area to permit pin 378 to pass through plate 252 twice during each complete rotation of cam 360.

A second well 384 is provided in the bottom surface of cam disc 362. A pair of anti-friction bearings 386, 388 are received in well 384 and retained therein by well-known means. A cylindrical pin 390 passes through bearings 386 and 388 and is affixed to the inner rings of both of those bearings in a well-known manner. Opening 370 is provided with two downwardly directed arm portions 392, 394 which are sufficiently large in area to permit pin 390 to pass through plate 252 twice during each complete rotation of cam toggle 360. The mode of cooperation of pin 378 with cam profile 318 and the mode of cooperation of pin 390 with cam profile 340 in carrying out the present invention will be described in detail hereinafter.

As may also be seen from FIG. 12, the axis of pin 378 passes through the cusp of lower cam track 366. Thus, it will be understood that when toggle cam 360 has rotated 180° from the position shown in FIG. 7 pin 378 and pin 348 will be coaxial.

Pin 310 may be seen in FIG. 7 to be coaxial with pin 390 when toggle cam 360 has *not* been rotated from the position shown in FIG. 7.

As will become apparent hereinafter, these two positions of toggle cam 360 (pins 378 and 348 coaxial; pins 310 and 390 coaxial) are the transition points or positions at which toggle arm 280 is momentarily perpendicular to mounting plate 252, i.e., in its neutral position, and thus vane 50 is passing through its neutral position as shown in FIG. 2. At these transition points radius arm 22 is substantially perpendicular to the chord of its blade 12.

Pivot shaft 238 passes through a close-fitting bore 396, the axis of which lies on the axis of cam disc 362. Toggle cam 360 is non-rotatably affixed to pivot shaft 238 for conjoint rotation therewith by means of a key 398 (FIG. 7) which is engaged with a keyway 400 in pivot shaft 238 and a keyway 402 in cam disc 362, all as seen in FIG. 7.

Pivot shaft 238 is so affixed to radius arm 22 that the plane containing the axis of pivot shaft 238 and bisecting keyway 400 (FIG. 7) is perpendicular to radius arm 22 and keyway 400 is on the left-hand side of pivot shaft 238 as viewed from mast 30.

The following observations may be made from FIGS. 3 and 7 by those having ordinary skill in the art, informed by the present disclosure.

(1) Any line intersecting the axis of cam disc 362 and toggle pivot axis 349 lies in the chord of blade 12.

(2) Any line beginning at toggle pivot shaft 349 and passing perpendicularly through the axis of follower pin 348 is parallel to toggle arm 280.

(3) Toggle pivot axis 349 lies in the same plane as the axes of follower pins 310 and 348, and is closer to pin 310 than to pin 348. (In the preferred embodiment, pin 310 is 0.263 inches from toggle pivot axis 349, and pin 348 is 0.487 inches from toggle pivot axis 349).

In light of these observations, the operation of the cam toggle mechanism may now be understood from FIG. 12.

Referring to FIG. 12, it will be understood that toggle pivot axis 349 was located therein by means of observation (3) immediately above.

The direction of the chord of blade 12 corresponding to the indicated positions of pins 310 and 348 in FIG. 12 was established by drawing a line ("G") connecting the axis of cam disc 362 and toggle pivot axis 349 in accordance with observation (1), supra.

The direction of toggle arm 280 corresponding to the indicated positions of pins 310 and 348 in FIG. 12 was established by drawing a line ("H") from toggle pivot shaft 349 passing through the axis of pin 348 in accordance with observation (2), supra.

The deflection angle of toggle arm 280 with respect to the chord of blade 12 corresponding to the positions of pins 310 and 348 shown in FIG. 12, i.e., the angle between lines "G" and "H," can be measured from FIG. 12 and will be found to be approximately 100°.

By similar constructions, following the same observations, it may be seen that:

(a) Toggle arm 280 remains at the same maximum deflection of approximately 100° with respect to the chord of blade 12 while pin 310 traverses the left-hand circular or "UL" portion of cam track 364.

(b) Toggle arm 280 remains at the same maximum deflection of approximately 100° with respect to the chord of blade 12, but on the opposite side of the chord of blade 12, while pin 310 traverses the right-hand circular or "UR" portion of cam track 364.

(c) When pin 348 is at the cusp of its track toggle arm 280 lies in the chord of blade 12, i.e., is in its neutral position.

(d) When pin 310 is at the cusp of its track toggle arm 280 lies in the chord of blade 12, i.e., is in its neutral position.

It will be evident to those having ordinary skill in the art, in view of the above, that cam toggle mechanism 250 and the lost motion coupling, etc., shown in FIG. 4 constitute deflecting means for alternately deflecting vane 50 from one side of the chord of blade 12 to the other as the turbine of the preferred embodiment is turned by the wind, and for causing vane 12 to dwell at each maximum deflection.

The sheath of Bowden cable 244 is non-rotatably affixed to the upper end of pivot shaft 238 by means of a locking collar 404 (FIG. 7), the provision of which is within the scope of one having ordinary skill in the art.

Returning again to FIG. 3, it will be seen that the upper end of Bowden cable 244 is received in a mounting block 408. Mounting block 408 is affixed to the lowest rib 86 of blade 12. Mounting block 408 is provided with a bore 410 which slidably receives control rod 212. Mounting block 408 is also provided with fastening means 412 by means of which one end of coil spring 222 is affixed to mounting block 408. Mounting block 408 is also provided with a pair of collinear bores 414, 416 which together extend completely through mounting block 408. The smaller bore 416 is larger than the diameter of the inner wire 243 of Bowden cable 244. Wire 243 passes freely through bore 416. A bearing 418 is received in bore 414 and affixed therein by well-known means. The upper end of the sheath of Bowden cable 244 is rotatably fixed in bearing 418, so that it is freely rotatable within bore 414 but cannot be withdrawn therefrom by the stresses imposed by the operation of the device of the preferred embodiment.

As also shown in FIG. 3, control rod 212 is provided with threads 420 at its right-hand end. A pair of nuts 422, 424 are engaged with threads 420, and a plate 426 is clamped between nuts 422 and 424, control rod 212 passing through a close-fitting hole in the upper end of plate 426.

Thus, plate 426 is firmly fixed to control rod 212 and cannot be moved along rod 212 or tilted with respect to rod 212. A bearing 428 is fixed in a bore in the lower part of plate 426. The inner control wire 243 of Bowden cable 244 is affixed to the inner, rotatable part of bearing 428, and thus control wire 243 is freely twistable or rotatable within bearing 428, but at the same time control wire 243 cannot be drawn into or out of the bore in plate 426 which contains bearing 428.

It follows that if the segment of control wire 243 shown at the bottom of FIG. 3 is drawn under pulley 245 and backward, i.e., behind and away from the plane of FIG. 3, control rod 212 will be moved to the left (as seen in FIG. 3) by an equal amount against the urging of coil spring 222, and that if the segment of control wire 243 shown at the bottom of FIG. 3 is allowed to move toward the viewer of FIG. 3 and upward, control rod 212 will be moved rightwardly (as seen in FIG. 3) by an equal amount under the urging of coil spring 222.

As further seen in FIG. 3, cam mounting plate 252, which is secured to blade 12 at its upper end, is secured to a bearing member 430 at its lower end. The inner ring of bearing member 430 is affixed to a split ring 432 (FIG. 3) which is itself affixed to the outer end of radius arm 22. Thus, the outer ring of bearing member 430 is freely and continuously rotatable without limit with respect to radius arm 22. Since mounting plate 252 is affixed to the outer ring of bearing member 430, and not to its inner ring, it can be seen from FIG. 3 that bearing 430 pivotably supports the lower end of blade 12. Pivot rod 238 passes through split ring 432, as does control wire 243. Thus, it will be seen that pivot rod 238 does not support blade 12, but rather that mounting plate 252, bearing member 430, and split ring 432 cooperate to pivotably mount blade 12 on radius arm 22 for continuous, unlimited rotation of blade 12 about its aforesaid pivot axis with respect to radius arm 22 as the prevailing wind turns the wind turbine of the preferred embodiment.

It is to be understood that each of the blades 14, 16, and 18 of the wind turbine of the preferred embodiment is not only provided with an associated steering vane 52, 54, 56, as pointed out hereinabove, but is also provided with a complete set of mounting and controlling parts shown in FIGS. 2 through 12 and described hereinabove in connection with blade-vane pair 12–50. Where necessary to complete this disclosure the mounting and controlling parts associated with blade 14 and steering vane 52 (sometimes referred to herein as blade-vane pair 14–52) will be identified by the reference numeral applied to the corresponding part shown in FIGS. 2 through 12 suffixed with the letter A; the mounting and controlling parts associated with blade 16 and steering vane 54 (sometimes referred to as blade-vane pair 16–54 hereinafter) will be identified by the reference numeral applied to the corresponding part shown in FIGS. 2 through 12 suffixed with the letter B; and the mounting and controlling parts associated with blade 18 and steering vane 56 (sometimes referred to as blade-vane pair 18–56 hereinafter) will be identified by the reference numeral applied to the corresponding part shown in FIGS. 2 through 12 suffixed with the letter C.

Thus, for example, it will be seen that steering vane 56 is pivotably mounted on blade 18 by means of a pair of arms 66C and 84C, which are substantially identical in construction and operation to arm 66 shown in FIG. 2 and arm 84 shown in part in FIG. 3, respectively.

Similarly, it will be seen that a bearing member 430B is pivotably mounted on a split ring 432B at the outer end of radius arm 26, and that a mounting plate 252B is affixed to the outer ring of bearing member 430B and to the lowest rib 86B of blade 16, whereby the lower end of blade 16 is pivotably mounted on radius arm 26.

It will also be seen that the upper end of blade 16 is provided with an anti-friction bearing 100B, mounted on a mounting plate 102B, and that a pivot rod 108B is affixed to the inner ring 110B of bearing 100B and to the outer end of radius arm 24, whereby the upper end of blade 16 is pivotably mounted on the outer end of radius arm 24.

It will further be seen that bearings 100A and 430A are coaxial with the pivot axis of blade 14, bearings 100B and 430B are coaxial with the pivot axis of blade 16, and bearings 100C and 430C are coaxial with the pivot axis of blade 18.

In general, then, the mounting and controlling means associated with any blade-vane pair 14-52, 16-54, or 18-56 may be understood by reviewing FIGS. 2 through 12 and the related text of the present specification, taking each reference numeral from 60 to 432 to have the letter A suffixed if pair 14-52 is being considered, the letter B suffixed if pair 16-54 is being considered, of the letter C suffixed if pair 18-56 is being considered, and also changing 12 to 14 and 50 to 52 if pair 14-52 is being considered, changing 12 to 16 and 50 to 54 if pair 16-54 is being considered, or changing 12 to 18 and 50 to 56 if pair 18-56 is being considered.

Referring now to FIGS. 13 and 14, there are shown the overspeed control means by which control wire 243 (FIGS. 3 and 7) is automatically operated to bring limit stops 194 and 198 (FIGS. 3 and 5) into contact with wedge 168 (FIGS. 3 and 5), and thus feather blade 12, i.e., constrain vane 50 to remain parallel to blade 12, whenever the prevailing wind causes the turbine of the preferred embodiment to rotate more rapidly than a predetermined safe design speed.

Although only the overspeed control means for operating control wire 243 and thus automatically controlling blade-vane pair 12-50 is completely shown in FIGS. 13 and 14 and described in connection therewith, it is to be understood that substantially identical overspeed control means for controlling blade-vane pairs 14-52, 16-54, and 18-56 are provided in the preferred embodiment, the reference numerals designating the non-common parts of the overspeed control means for blade-vane pair 14-52 being the same as the reference numerals designating the corresponding non-common parts of the overspeed control means for blade-vane pair 12-50, suffixed with the letter A, the reference numerals designating the non-common parts of the overspeed control means for blade-vane pair 16-54 being the same as the reference numerals designating the corresponding non-common parts of the overspeed control means for blade-vane pair 12-50, suffixed with the letter B, and the reference numeral designating the non-common parts of the overspeed control means for blade-vane pair 14-52 being the same as the reference numerals designating the corresponding non-common parts of the overspeed control means for blade-vane pair 12-50, suffixed with the letter C. As will be apparent from FIG. 13, these suffixes will not be applied to the reference numerals 30, 488, 494, 498, 500, 502, 504, 506, 510, 512, 516, 520, 522, and 526, because the parts designated by these reference numerals are common to the overspeed control means for all of the blade-vane pairs.

While these overspeed control means like many of the mounting and controlling means of FIGS. 2 through 12 were omitted from FIG. 1 for clarity of illustration, it is to be understood that the device of the preferred embodiment includes all of the mounting and controlling means shown in FIGS. 2 through 14 and described in connection therewith.

Going to FIG. 13, then, and comparing it with FIG. 14, it will be seen that a massive carriage 440 (sometimes called a "centrifugal mass") is moveably mounted on radius arm 22 by means of a pair of wheels or rollers 442, 444. Wheels 442, 444 are affixed to axles 446, 448, respectively, and axles 446, 448 are journalled in suitable bearings which are mounted in openings in the walls 450, 452 of carriage 440 (FIG. 14). The walls 450, 452 of carriage 440 are affixed to the opposite sides of a weight 456.

As may be seen from FIG. 14, control wire 243 passes through a clearance bore 460 in weight 456. Clearance bore 460 extends completely through weight 456 from end to end and is located at the upper end of a slot 462. Slot 462 is narrower than the diameter of clearance bore 460 and is preferably only wide enough so that control wire 243 can be forcibly passed through it.

As may be seen from FIG. 13, a sleeve 466 surrounds radius arm 22. Adjustable fastening means such as a set screw 468 is provided for affixing sleeve 466 to radius arm 22 at a selected position.

A coil spring 470 extends between carriage 440 and sleeve 466, being affixed to a lug 474 which is integral with carriage 440 and also affixed to a lug 472 which is integral with sleeve 466.

As also seen in FIG. 13, a stop or centrifugal force coupling means 478 is affixed to control wire 243 so as to be immovable along control wire 243. Stop 478 is generally cylindrical in the preferred embodiment, and is larger in diameter than the diameter of bore 460 in weight 456.

As seen in FIG. 13, a pulley 480 is located immediately under radius arm 22 a short distance from mast 30. Pulley 480 is pivotably suspended by conventional means such as a pair of arms 482 and 482' (not shown) through the outer ends of which pass a shaft or axle 484 on which pulley 480 is journalled. As also seen in FIG. 13, a substantially identical pulley 480B is pivotably suspended under radius arm 26. Corresponding pulleys 480A and 480C are similarly suspended beneath radius arms 32 and 31, respectively.

Control wire 243 is reaved through arms 482, 482' and passes over pulley 480, whereafter it is directed vertically downwardly to a toroidal weight 488. The lower end of control wire 243 is affixed to toroidal weight 488. As also seen in FIG. 13, the lower end of control wire 243B is affixed to toroidal weight 488 after passing over pulley 480B. Similarly, although not shown in FIG. 13, the lower ends of control wires 243A and 243C are also affixed to toroidal weight 488 after passing over pulleys 480A and 480C, respectively. The tie points at which these control wires are affixed to toroidal weight 488 are located approximately to 90° apart around the axis of mast 30 in the preferred embodiment.

As can now be seen by those having ordinary skill in the art, informed by the present disclosure, the overspeed control mechanism described above in connection with FIGS. 13 and 14 acts as a centrifugal governor for the wind turbine of the preferred embodiment, in the sense that it serves to drive the control wires 243, 243A, 243B, 243C in such a direction as to feather the blades 12, 14, 16, 18 and thus shut down the turbine whenever the prevailing wind causes the turbine to rotate at a predetermined maximum safe designed speed.

This feathering and shut down action is brought about as follows. (In what immediately follows expressions such as "the carriages 440" should be understood to include all of the carriages 440, 440A, 440B, and 440C, "the stops 478" should be understood to include the stops 478, 478A, 478B, and 478C, etc.)

(1) As the rotational speed of the turbine increases the carriages 440 are drawn outwardly along their associated radius arms 22, 32, 26, 31 by centrifugal force against the restraining force of their associated return springs 470.

(2) At a speed below the abovesaid safe design speed the carriages 440 reach and come into contact with their associated stops 478.

(3) As the speed of the turbine increases further the stops 478 are forced to move outwardly from mast 30, thus raising toroidal weight 488 and tending to slacken the portions of the control wires 243 which lie outwardly of the stops 478.

(4) As best seen from FIG. 3, however, the control wires 243 will not slacken, but rather the coil springs 222 will contract, and the control rods 212 will move outwardly away from mast 30, thus also moving the limit stops 194, 198 outwardly, i.e., to the right in FIG. 3.

(5) Going to FIG. 5, and comparing it with FIG. 3, it will be seen that this outward movement of stops 194, 198 will ultimately result in each pair of these stops contacting its associated wedge 168.

(6) As explained above, such contact between stops 194, 198 and their associated wedges 168 prevents the vanes 50, 52, 54, 56 from being deflected at all, i.e., feathers the associated blades 12, 14, 16, 18.

(7) Since the torques which rotate the turbine depend upon the horizontal lift resulting from the inclination of each blade to the relative wind at that blade, it follows that when all four blades are feathered, i.e., not caused by their associated vanes to assume an angle of attack with respect to the relative wind at the blade, the turbine will be shut down because no torque will be available to turn it.

(8) It follows that the overspeed control shown and described in connection with FIGS. 13 and 14 will automatically shut down the turbine of the preferred embodiment at said safe design speed, i.e., the speed of turbine rotation at which centrifugal force drives the carriages 440 far enough outwardly so that, by means of the control wires 243, etc., the stops 194, 198 are brought into contact with their associated wedges 168.

It will now be evident to those having ordinary skill in the art, informed by the present disclosure, that as the wind at the site of the turbine of the preferred embodiment drops in speed below its speed corresponding to said safe design speed of the turbine a reverse action will take place, the stops 194, 198 (FIG. 5) will move away from the angulated faces of the wedges 168, and the vanes 50, 52, 54, 56 will again be permitted to change their angles of deflection with respect to the chords of their associated blades 12, 14, 16, 18, cyclically as the turbine turns, under the control of the cam toggle mechanisms 250. It will also be evident that over an extended range the maximum deflection which can be assumed by the vanes 50, 52, 54 and 56 will be determined by the position of toroidal weight 488 on mast 30.

It will now also be evident that the lost motion arrangements 152 of FIG. 4 permit the toggle arms 290 of the cam toggle mechanisms 250 to continue oscillating (due, e.g., to continued inertial rotation of the turbine), even though the vanes and vane arms 84 are clamped in their feathered positions, without damage to the turbine.

It will further be evident that the overspeed control means controlling different ones of the blades 12, 14, 16, 18 can be altered, e.g., by locating some of the stops 478 further from their associated carriages 440 at rotor standstill than others, so that some of the blades 50, 52, 54, 56 are feathered at lower speeds than others. It is to be understood that all such differential blade shutdown embodiments fall within the scope of the present invention.

Referring again to FIG. 13, it will be seen that in addition to the automatic overspeed control means just described manual control means are also provided for the wind turbine of the preferred embodiment. These manual control means are generally designated by the reference numeral 494.

Manual control means 494 comprises a sleeve 498 which loose-fittingly surrounds mast 30 and thus can slide up and down on mast 30. (As pointed out above, mast 30 rotates in its bearings 33, 34 whenever the wind turbine of the preferred embodiment is turned by the wind.)

Sleeve 498 passes loose-fittingly through the circular central opening in toroidal weight 488, and thus toroidal weight 488 can and does rotate about sleeve 498 when the turbine of the preferred embodiment is turned by the wind.

As also seen in FIG. 13, sleeve 498 is provided with an integral ear 500. An arm 502 is pivotably affixed to ear 500, and thus to sleeve 498, by means, for instance, of a pivot pin 504. Arm 502 may be guided by a loose-fitting sleeve 506, or a pair of suitable flanges or jaws, so that arm 502 cannot rotate about the axis of mast 30 as the turbine of the preferred embodiment is turned by the wind. Sleeve 498, then, is also prevented from rotating about the axis of mast 30. Manually operated lever means (not shown) are provided at the lower end of arm 502 to move arm 502 upwardly and downwardly parallel to itself at the will of the operator of the turbine of the preferred embodiment.

Sleeve 498 is also provided with a set of four spindles 510, 512, 514 (not shown), and 516 on each of which a wheel or roller 520, 522, 524 (not shown), 526 is rotatably mounted as by means of an anti-friction bearing.

As will be evident from FIG. 13, toroidal weight 488 rides on these four wheels or rollers. Thus, toroidal weight 488 is both free to turn with respect to sleeve 498, and at the same time rests on the wheels 520, 522, 524, 526, except when raised from contact with these wheels by the automatic overspeed control means just described.

As will now be evident to those having ordinary skill in the art, informed by the present disclosure, the turbine of the preferred embodiment can be shut down manually by so manipulating the abovesaid manually operated lever means as to raise sleeve 498 and toroidal weight 488, thus raising the lower ends of the control wires 243 and permitting the coil springs 222 (FIG. 3) to draw the stops 194, 198 (FIG. 5) into contact with their associated wedges 168. As explained above, contact between the stops 194, 198 and their associated wedges 168 feathers the blades of the turbine and thus shuts down the turbine.

It will also be evident that by providing suitable detenting means to lock said manually operated lever means (and thus sleeve 498) in any one of a plurality of selectable positions, the limit stops 194, 198 (FIG. 5) can also be locked in any one of a plurality of selectable positions, and thus the maximum deflection of vanes 52, 54, 56, and 58 may be manually controlled.

Additional automatic control means for moving arm 502 or otherwise positioning sleeve 498 on mast 30 in response to certain parameters of turbine operation such as turbine speed, prevailing wind speed, etc., may be provided in accordance with certain teachings of the present invention.

Figure 15:
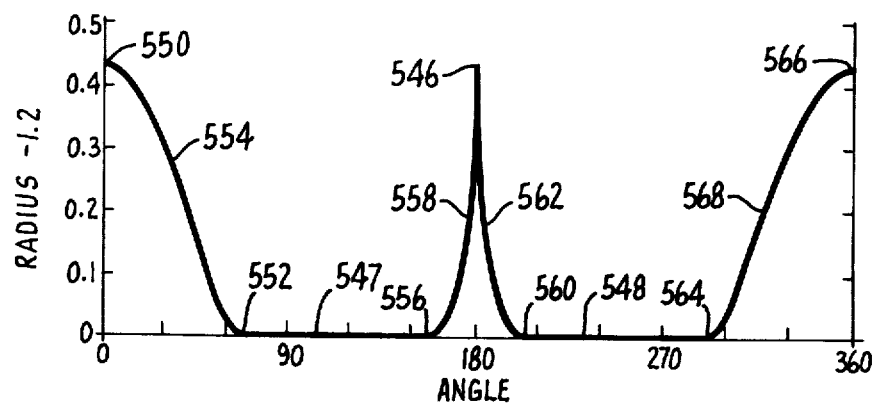
FIG. 15 is a rectangular Cartesian coordinate representation of the path followed by the axis of a ⅜ inch milling cutter in cutting the lower cam track of one of the toggle cams of the pivoted blade barrel rotor wind turbine of FIG. 1.

FIG. 15 is a rectangular Cartesian coordinate representation of the path followed by the axis of a ⅛ inch milling cutter about the center of cam disc 362 (FIGS. 3, 4, 7, and 12) in cutting the lower (larger) cam track 366 (FIG. 12).

Since, as may be seen in FIG. 12, the upper and lower (smaller and larger) cam tracks 364, 366 have two pairs of mutually overlying circular portions 530, 532, 534, and 536, of 1.2 inch radius in the preferred embodiment, the ordinates of the points of the curve of FIG. 15 represent the radial deviations of the milling cutter axis from a 1.2 inch circle struck about the center of cam disc 362, for the convenience of those having ordinary skill in the art in fabricating specimens of the preferred embodiment. More specifically, the numerical values of the ordinates of the points of the curve of FIG. 15, as read from the scale graduated on the axis of ordinates in FIG. 15, are equal to the numerical values of the radial deviations of the milling cutter axis from a 1.2 inch circle struck about the center of cam disc 362 when said milling cutter is following said path.

The radius in inches of any point of the milling cutter path from the center of cam disc 362 may, of course, be easily determined by adding 1.2 to the corresponding ordinate determined graphically from FIG. 15.

The numerical value of the abscissa of each point on the curve of FIG. 15, as read from the scale graduated on the axis of abscissas, is equal to the numerical value in degrees of the angle between a plane containing point 540 (FIG. 12) and the axis of cam disc 362 and a plane containing the axis of cam disc 362 and the position of the milling cutter axis corresponding to that point. Thus, the cusp 542 of the large cam track 366 (FIG. 12) can be seen in FIG. 12 to be located 180° from point 540, about the center of cam disc 362, and, correspondingly, the cusp of cam track 366 is obviously represented by point 546 of the curve of FIG. 15, the abscissa of which can be seen from the axis of abscissas of FIG. 15 to be 180°. The extreme abscissas of FIG. 15 represent the angular location of point 540 of FIG. 12.

The expression "cusp 542 of cam track 366," and like expressions, are to be understood to denote the part of cam track 366 intersected by a plane containing the cusp 544 of the contour of cam track 366 (FIG. 12A) and the axis of cam disc 362. The outside wall of cam track 366 closely surrounding cusp 542 is not cuspate in form because of the finite diameter of pin 348 (FIG. 3).

It will also be seen that the two rectilinear segments 547, 548 of the curve of FIG. 15, which lie on the axis of abscissas, correspond to the two circular dwell portions "LR," "LL" (FIG. 12) of the lower (larger) cam track 366. The first curvilinear segment of the curve of FIG. 15, extending from point 550 to point 522, will sometimes hereinafter be designated by the reference numeral 554.

The second curvilinear segment of the curve of FIG. 15, extending from point 556 to point 546, will sometimes be hereinafter designated by the reference numeral 558.

Similarly, the third curvilinear segment of the curve of FIG. 15, extending from point 546 to point 560, will be designated by the reference numeral 562, and the fourth curvilinear segment of the curve of FIG. 15, extending from point 564 to point 566, will be designated by the reference numeral 568.

Segment 568 will be seen to be a mirror image of segment 554, and segment 562 will be seen to be a mirror image of segment 558.

It will also be understood that segments 558 and 562 taken together correspond to the cuspate portion of cam track 366 (FIG. 12) which extends from dwell portion "LR" to dwell portion "LL;" and that segments 554 and 568 taken together correspond to the non-singular, active (i.e., continuously follower displacing) portion of cam track 366 which extends from dwell portion "LR" to dwell portion "LL."

Figure 16:
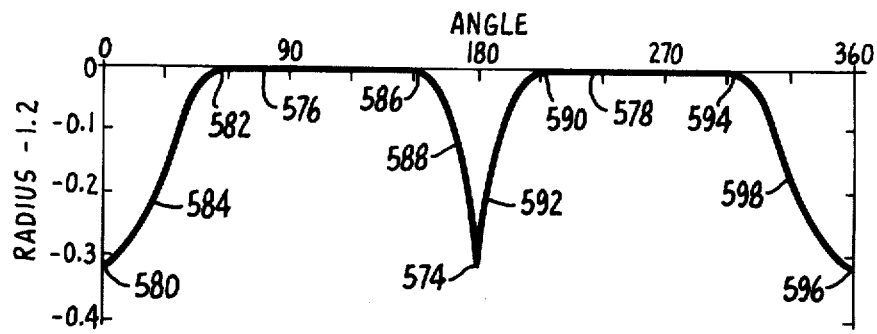
FIG. 16 is a rectangular Cartesian coordinate representation of the path followed by a ⅜ inch milling cutter in cutting the upper cam track of one of the toggle cams of the pivoted blade barrel rotor wind turbine of FIG. 1.

FIG. 16 is a rectangular Cartesian coordinate representation of the path followed by the axis of a ⅛ inch milling cutter about the center of cam disc 362 (FIGS. 3, 4, 7, and 12) in cutting the upper (smaller) cam track 364 (FIG. 12). The ordinates of the points of the curve of FIG. 16 represent the radial deviations of the milling cutter axis from a 1.2 inch circle struck about the center of cam disc 362. More specifically, the numerical values of the ordinates of the points of the curve of FIG. 16, as read from the scale graduated on the axis of coordinates in FIG. 16, are equal to the numerical values of the radial deviations of the milling cutter axis from a 1.2 inch circle struck about the center of cam disc 362 when said milling cutter is following said path.

In FIGS. 15 and 16, negative ordinates indicate points inside said 1.2 inch circle, and positive ordinates indicate points outside said 1.2 inch circle.

The radius in inches of any point of the milling cutter path may, of course, be easily determined by adding 1.2 to the numerical value of the corresponding ordinate determined graphically from FIG. 16.

The numerical value of the abscissa of each point on the curve of FIG. 16, as read from the scale graduated on the axis of abscissas, is equal to the numerical value in degrees of the angle between a plane containing point 570 (FIG. 12) and the axis of cam disc 362 and a plane containing the axis of cam disc 362 and the position of said milling cutter axis corresponding to that point. Thus, the cusp 572 of the smaller cam track 364 can be seen in FIG. 12 to be located 180° from point 570, about the center of cam disc 362, and correspondingly, the cusp of cam track 364 is obviously represented by point 574 of the curve of FIG. 16, the abscissa of which can be seen from the axis of abscissas of FIG. 16 to be 180°. The extreme abscissas of FIG. 16 represent the angular location of point 570 of FIG. 12.

The expression "cusp 572 of cam track 364," and like expressions, are to be understood to denote the part of cam track 364 intersected by a plane containing the cusp 573 of the contour of cam track 364 (FIG. 12B) and the axis of cam disc 362. The inside wall of cam track 364 closely surrounding cusp 572 is not cuspate in form because of the finite diameter of pin 310 (FIG. 3).

It will also be seen that the two rectilinear segments 576, 578 of the curve of FIG. 16, which lie on the axis of abscissas, correspond to the two circular dwell portions "UR," "UL" of the upper (smaller) cam track 364 (FIG. 12). The first curvilinear segment of the curve of FIG. 16, extending from point 580 to point 582, will sometimes hereinafter be designated by the reference numerical 584. The second curvilinear segment of the curve of FIG. 16, extending from point 586 to point 574, will sometimes hereinafter be designated by the reference numeral 588.

Similarly, the third curvilinear segment of the curve of FIG. 16, extending from point 574 to point 590, will be designated by the reference numeral 592, and the fourth curvilinear segment of the curve of FIG. 16, extending from point 594 to point 596, will be designated by the reference numeral 598.

Segment 598 will be seen to be a mirror image of segment 584, and segment 592 will be seen to be a mirror image of segment 588.

It will also be understood that segments 588 and 592 taken together correspond to the cuspate portion of cam track 364 (FIG. 12) which extends from dwell portion "UR" to dwell portion "UL;" and that segments 584 and 598 taken together correspond to the non-singular, active (i.e., continuously follower displacing) portion of cam track 364 which extends from dwell portion "UR" to dwell portion "UL."

The points 542 and 572 will sometimes hereinafter be called "transition points" of their respective cam tracks, because, as may be seen from FIGS. 3 and 12 by those having ordinary skill in the art, points 542 and 572 are indeterminate points whereat pins 310 and 348 (FIG. 3) lie on a radius of cam disc 362 and thus may impart little torque to toggle arm 280 (FIG. 3).

In order to assure that those having ordinary skill in the art can simply and expeditiously fabricate specimens of the cam disc 362 of the preferred embodiment, using an ordinary numerically-controlled milling machine, the coordinates of a number of points lying on segment 554 of the curve of FIG. 15 are set out in Table I immediately below.

TABLE I

| Abscissa (Degrees) | Ordinate (Inches) |
|---|---|
| 0.0 | 0.432 |
| 6.0 | 0.427 |
| 11.9 | 0.412 |
| 17.7 | 0.387 |
| 23.4 | 0.354 |
| 28.8 | 0.315 |
| 34.0 | 0.272 |
| 38.9 | 0.226 |
| 43.5 | 0.181 |
| 47.8 | 0.137 |
| 51.9 | 0.098 |
| 55.6 | 0.064 |
| 59.2 | 0.036 |
| 62.6 | 0.016 |
| 65.8 | 0.004 |

As will be evident to those having ordinary skill in the art, informed by the present disclosure, a corresponding tabulation for segment 568 of the curve of FIG. 15 may be prepared by replacing each abscissa entry in Table I with the difference between 360 and that entry.

The coordinates of a number of points lying on segment 558 of the curve of FIG. 15 are set out in Table II immediately below.

TABLE II

| Abscissa (Degrees) | Ordinate (Inches) |
|---|---|
| 161.8 | 0.004 |
| 164.6 | 0.016 |
| 167.2 | 0.036 |
| 169.6 | 0.064 |
| 171.9 | 0.098 |
| 173.8 | 0.137 |
| 175.5 | 0.181 |
| 176.9 | 0.226 |
| 178.0 | 0.272 |
| 178.8 | 0.315 |
| 179.4 | 0.354 |
| 179.7 | 0.387 |
| 179.9 | 0.412 |
| 180.0 | 0.427 |
| 180.0 | 0.432 |

A corresponding tabulation for segment 562 of the curve of FIG. 15 may be prepared by replacing each abscissa entry in Table II with the difference between 360 and that entry.

The coordinates of a number of points lying on segment 584 of the curve of FIG. 16 are set out in Table III immediately below.

TABLE III

| Abscissa (Degrees) | Ordinate (Inches) |
|---|---|
| 0.0 | −0.318 |
| 6.0 | −0.313 |
| 11.7 | −0.297 |
| 17.1 | −0.274 |
| 22.0 | −0.244 |
| 26.4 | −0.211 |
| 30.4 | −0.176 |
| 33.9 | −0.142 |
| 37.2 | −0.110 |
| 40.3 | −0.081 |
| 43.2 | −0.056 |
| 46.1 | −0.036 |
| 48.9 | −0.020 |
| 51.7 | −0.009 |
| 54.6 | −0.002 |

As will be evident to those having ordinary skill in the art, informed by the present disclosure, a corresponding tabulation for segment 598 of the curve of FIG. 16 may be prepared by replacing each abscissa entry in Table III with the difference between 360 and that entry.

The coordinates of a number of points lying on segment 588 of the curve of FIG. 16 are set out in Table IV immediately below.

TABLE IV

| Abscissa (Degrees) | Ordinate (Inches) |
|---|---|
| 150.6 | −0.002 |
| 153.7 | −0.009 |
| 156.9 | −0.020 |
| 160.1 | −0.036 |
| 163.2 | −0.056 |
| 166.3 | −0.081 |
| 169.2 | −0.110 |
| 171.9 | −0.142 |
| 174.4 | −0.176 |
| 176.4 | −0.211 |
| 178.0 | −0.244 |
| 179.1 | −0.274 |
| 179.7 | −0.297 |
| 180.0 | −0.313 |
| 180.0 | −0.318 |

A corresponding tabulation for segment 592 of the curve of FIG. 16 may be prepared by replacing each abscissa entry in Table IV with the difference between 360 and that entry.

Figure 17:
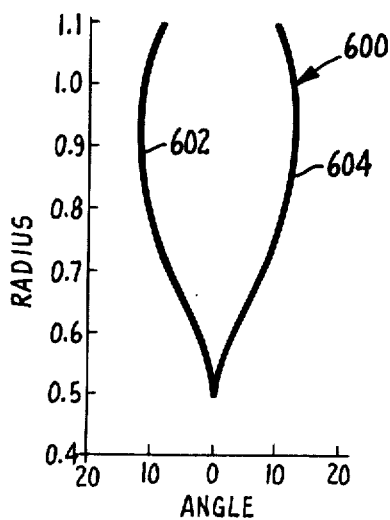
FIG. 17 is a rectangular Cartesian coordinate representation of the path followed by a ⅜ inch milling cutter in cutting the cam profile of the upper pivot block of FIG. 7.

FIG. 17 is a rectangular Cartesian coordinate representation of the path followed by the axis of a ⅜ inch milling cutter about the axis of stub shaft 276 (FIGS. 8 and 9) in cutting cam profile 318.

The numerical value of the ordinate of each point on the curve of FIG. 17, as read from the scale graduated on the axis of ordinates in FIG. 17, is equal to the numerical value of the minimum distance in inches from the axis of stub shaft 276 (FIGS. 8 and 9) to the corresponding position of the axis of said milling cutter when generating cam profile surface 318.

The numerical value of the abscissa of each point on the curve of FIG. 17, as read from the scale graduated on the axis of abscissas, is equal to the numerical value in degrees of the angle between a plane containing the position of the axis of said milling cutter corresponding to that point and the axis of stub shaft 276 and the plane of symmetry of cam profile surface 318.

Figure 18:
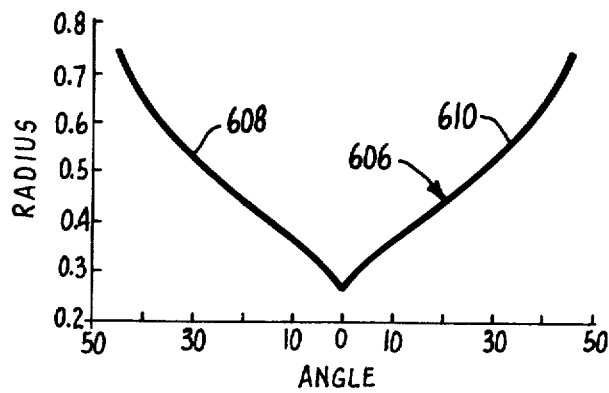
FIG. 18 is a rectangular Cartesian coordinate representation of the path followed by a ⅜ inch milling cutter in cutting the cam profile of the lower pivot block of FIG. 7.

FIG. 18 is a rectangular Cartesian coordinate representation of the path followed by the axis of a ⅜ inch milling cutter about the axis of stub shaft 332 (FIGS. 10 and 11) in cutting cam profile 340.

The numerical value of the ordinate of each point on the curve of FIG. 18, as read from the scale graduated on the axis of ordinates of FIG. 18, is equal to the numerical value of the minimum distance in inches from the axis of stub shaft 332 to the corresponding position of the axis of said milling cutter when generating cam profile surface 340.

The numerical value of the abscissa of each point on the curve of FIG. 18, as read from the scale graduated on the axis of abscissas, is equal to the numerical value in degrees of the angle between a plane containing the position of the axis of said milling cutter corresponding to that point and the axis of stub shaft 332 and the plane of symmetry of cam profile surface 340.

In order to assure that those having ordinary skill in the art can simply and expeditiously fabricate specimens of the upper pivot 300 of the preferred embodiment using an ordinary numerically-controlled milling machine, the coordinates of a number of points lying on the curve of FIG. 17 are set out in Table V immediately below.

TABLE V

| Abscissa (Degrees) | Ordinate (Inches) |
|---|---|
| 8.7 | 1.094 |
| 10.5 | 1.035 |
| 11.4 | 0.975 |
| 11.7 | 0.917 |
| 11.2 | 0.859 |
| 10.2 | 0.803 |
| 8.8 | 0.749 |
| 7.1 | 0.697 |
| 5.3 | 0.648 |
| 3.6 | 0.604 |
| 2.1 | 0.565 |
| 1.0 | 0.532 |
| 0.3 | 0.507 |
| 0.0 | 0.492 |
| 0.0 | 0.487 |

As will be evident to those having ordinary skill in the art, informed by the present disclosure, each pair of entries in Table V corresponds to two points on curve 600 of FIG. 17, one on the left branch 602 and one on the right branch 604.

The coordinates of a number of points lying on the curve of FIG. 18 are set out in Table VI immediately below.

TABLE VI

| Abscissa (Degrees) | Ordinate (Inches) |
|---|---|
| 44.8 | 0.767 |
| 43.3 | 0.721 |
| 40.9 | 0.675 |
| 37.7 | 0.629 |
| 33.9 | 0.583 |
| 29.5 | 0.538 |
| 24.7 | 0.494 |
| 19.7 | 0.451 |
| 14.8 | 0.410 |
| 10.1 | 0.372 |
| 6.1 | 0.337 |
| 2.9 | 0.307 |
| 1.0 | 0.283 |
| 0.1 | 0.268 |
| 0.0 | 0.263 |

As will be evident to those having ordinary skill in the art, informed by the present disclosure, each pair of entries in Table VI corresponds to two points on curve 606 of FIG. 18, one on the left branch 608 and one on the right branch 610.

When it is desired to operate wind turbines embodying the present invention at constant rotor speed over as wide a range of wind speeds as possible additional automatic control means must be provided to compensate for the reduction of the coupling between the rotor and the moving air (wind) which occurs at low wind speeds.

This reduction of coupling occurs because at low wind speeds the blades of a constant speed rotor will be turning at peripheral speeds greatly in excess of the wind speed and thus the turbine will present to the oncoming wind a solidity greatly in excess of the optimum.

Due to this excessive solidity the airflow through the turbine will be choked and the flow of air will tend to by-pass the turbine rather than go through it.

To compensate at least in part for this reduction of coupling and thus increase the output torque of the turbine at constant rotor speed in low wind conditions it is desirable to reduce the maximum deflection of the steering vanes 50, 52, 54, 56 and thus reduce the maximum angle of attack of blades 12, 14, 16, 18 in low wind conditions. Additional automatic control means for automatically accomplishing this reduction of maximum blade angle of attack, called herein "low wind controls," constitute a part of the present invention and will now be described.

These low wind controls provide forces to raise toroidal weight 488 and thus reduce the maximum vane deflection limit as explained hereinabove in response to low wind speed and low power output from the turbine of the preferred embodiment.

As shown in FIG. 19, a first low wind control according to the present invention consists of a wind drag drogue 620 which flies or streams out from the top of an extension of mast 30 in the prevailing wind and thus provides a force which increases and decreases in accordance with the strength of the prevailing wind. Other wind strength responsive means may be employed within the scope of the invention.

The drogue cable 622 passes through an anti-friction bushing 624 in the top of a mast extension 626, and down the interior of mast extension 626 and mast 30 to a block 628 located within mast 30. Three openings 630, 632 (not shown), and 634 pass through the wall of mast 30 and are equiangularly disposed about the axis of mast 30. A lever 636 is pivotably mounted in opening 630 by means of a pivot pin 638. Similarly, a lever 640 is pivotably mounted in opening 632, and a lever 642 (shown broken for clarity of illustration) is pivotably mounted in opening 634.

The inner ends of levers 636, 640, and 642 are engaged in suitable equiangularly disposed sockets in block 628, so that the outer ends of these levers move jointly when block 68 is displaced along the axis of mast 30.

A cylindrical sleeve 644 is affixed to the upper surface of toroidal weight 488, and the outer ends of the levers 636, 640, and 642 normally bear on the top of sleeve 644.

As will be evident to those having ordinary skill in the art, informed by the present disclosure, the wind force experienced by drogue 620 is transmitted to toroidal weight 488 by way of wind force coupling means including cable 622, block 628, levers 636, 640, and 642, and sleeve 644, etc., and thus the wind force experienced by drogue 620 imparts to toroidal weight 488 a downward force proportioned to the strength of the prevailing wind, i.e., a downward force which decreases in magnitude at low wind speeds.

Since the downward force on toroidal weight 488 decreases at lower wind speeds, weight 488 will rise at lower wind speeds, in response to the urging of coil springs 222, 222A, 222B, and 222C, thus reducing the vane deflection limit and blade angle of attack limit in the manner set out in detail hereinabove.

A second low wind control of the present invention senses the torque in the power take-off shaft of the turbine of the invention, directly or indirectly, and in response to a decrease in output torque lifts toroidal weight 488 by a predetermined amount at low wind speeds.

Referring now to FIG. 20, there is shown an alternative cam toggle mechanism which may be employed in constructing certain embodiments of the present invention.

In this alternative cam toggle mechanism a cam 660 is affixed to cam pivot shaft 238 (FIG. 7) by means of a key 398 (FIG. 7) and suitable keyways of the kind shown in FIG. 7.

The profile of cam 660 comprises two oppositely located circular portions 662, 664 which are of different radius. For this reason, cam 660 will sometimes be called a "two-radius cam" herein.

The profile of cam 660 also comprises two transition portions 666, 668 which are designed in accordance with well-known principles of cam design to provide the smoothest possible, i.e., least accelerated, transitions between the circular portions 662, 664. The profile of cam 660 is symmetrical about a line joining the centers of circular portions 662 and 664, i.e., the portions of the profile of cam 660 on opposite sides of this line can be thought of as "mirror images" of each other.

A rocker member 670 is affixed to a pivot shaft 672, as by means of a suitable key 671 and cooperating keyways. Pivot shaft 672 is journalled in a pair of suitable anti-friction bearings which are themselves mounted in recesses in a pair of bearing blocks similar to the bearing blocks 254, 256 of FIG. 7.

A pair of rollers 674, 676 are rotatably mounted on respective bosses 678, 680 by means of anti-friction bearings 682, 684. Bosses 678, 680 are affixed to or integral with rocker member 670 and are so spaced apart that rollers 674, 676 remain in contact with or very closely spaced from the profile of cam 660 throughout the rotation of cam 660.

A toggle arm 686 similar to the toggle arm 280 of FIG. 7 and serving essentially the same purpose as that of the toggle arm 280 of FIG. 7 is affixed to a pivot shaft 688, as by means of a key 689 and suitable keyways. Pivot shaft 688 is journalled in suitable anti-friction bearings which are themselves mounted in recesses in the aforesaid bearing blocks on which pivot shaft 672 is pivotably mounted.

A pair of flexible bands of steel or other suitable material 690, 692 are affixed at their outer ends to the large circular curved peripheral arc 693 of rocker 670 by means of suitable set screws 694, 696. The inner ends of bands 690, 692 are affixed to pivot shaft 688 by clamping means 698.

It will be apparent to those having ordinary skill in the art, informed by the present disclosure, that when the wind turbine in which the cam arrangement of FIG. 20 is employed is rotated by the prevailing wind cam 660 rotates continuously with respect to the blade on which it is mounted. Thus, rocker member 670 will be repeatedly rocked about the axis of pivot shaft 672, and will dwell at each of its extremes of rocking motion for upwards of 90° of cam rotation. Due to the coupling action of bands 690, 692, etc., toggle arm 686 will be correspondingly rocked and caused to dwell, and thus the vane mounted on the blade on which the cam arrangement of FIG. 20 is mounted will be correspondingly rocked and caused to dwell.

OPERATION

Having now described in detail the parts and subassemblies of a preferred embodiment of the present invention, and the modes of operation of certain novel and inventive ones of said subassemblies, it will be evident to those having ordinary skill in the art that the wind turbine of the preferred embodiment operates in general as follows.

As described in detail hereinabove, the wind turbine of the preferred embodiment comprises four blades 12, 14, 16, 18, each of which is pivotably mounted on an associated pair of radius arms for rotation about a central, vertical mast 30 in response to the prevailing wind.

The blades 12, 14, 16, 18 are vertically disposed airfoils of zero mean chamber. On each blade an associated vane 50, 52, 54, 56 is pivotably mounted by means of a pair of vane support arms, the length of the vane support arms and the location of their pivot axes being such that each vane can be deflected from side-to-side of its associated blade, and that in passing through the chord of the associated blade the leading edge of each vane is spaced from the trailing edge of its associated blade.

Since each blade is pivotably mounted on the outer ends of its associated radius arms, each blade will tend to stream downwind in response to the wind prevailing at the turbine of the preferred embodiment.

Since each blade is of zero mean chamber it follows that absent the action of the associated vanes the lift generated on the opposite sides of each blade will substantially cancel out and there will be no net horizontal lift force to drive the turbine about mast 30.

Going to FIG. 2, however, and considering the prevailing wind to be coming from the right-hand side thereof and blowing directly across FIG. 2, it will be seen that if vane 50 is deflected to the right (as seen by an observer facing upwind) blade 12 will be "steered"

by vane 50 to assume such an attitude as to result in positive lift (downward in FIG. 2). Similarly, if vane 50 is deflected to the left (as seen by an observer facing upwind), the attitude assumed by blade 12 will result in negative lift, i.e., upwardly directed lift as seen in FIG. 2.

Expressed alternatively, the angle of attack and thus the direction of lift of each blade depends upon the deflection of its associated vane, the angle of attack and the direction of lift being positive when the deflection of the associated vane is positive, and the angle of attack and the direction of lift being negative when the deflection of the associated vane is negative (defining positive and negative as indicated by the plus and minus signs in FIG. 2).

If the angle of attack of each blade is individually reversed when the angle of that blade relative to its associated radius arm goes from inside the perpendicular to the radius arm at the blade pivot axis to outside that perpendicular then the lift of every blade will always have a tangential component driving the rotor of the wind turbine forward.

The cam toggle mechanisms 250, 250A, 250B, 250C shown in FIGS. 3, 4, 7, 8, 9, 10, 11, and 12, and described hereinabove, serve to thus individually reverse the angles of attack of their associated blades by correspondingly reversing the deflections of their associated vanes. Further, the cam toggle mechanisms 250, 250A, 250B, 250C are particularly constructed and arranged in accordance with certain principals of the present invention to very rapidly switch their associated vanes and thus their associated blades between their maximum deflections and corresponding maximum angles of attack whereby to maximize the wind power extraction efficiency of the wind turbines of the invention.

The mode of operation of toggle cam mechanisms 250, 250A, 250B, 250C may be understood by considering only cam toggle mechanism 250.

Going to FIG. 7 and reviewing the description thereof found hereinabove it will be understood that each time the turbine of the preferred embodiment rotates through 360° toggle cam 360 rotates through 360° with respect to plate 252, and thus with respect to blade 12. It will also be understood that during a complete 360° rotation of toggle cam 360 with respect to blade 12 follower pin 310 completely traverses cam track 364 and follower pin 348 completely traverses cam track 366.

Comparing FIGS. 3 and 4, it will be seen that toggle arm 280 cooperates with fork 124 in such manner that vane support arm 84, and thus vane 50 are deflected each time toggle arm 280 is deflected. It follows that blade 12 will assume a corresponding angle of attack each time toggle arm 280 is deflected.

It will be seen from FIG. 7 (taken in conjunction with FIG. 3) that the angle between toggle arm 280 and the chord of blade 12 is determined by the relative positions of follower pins 310 and 348 with respect to the axis of cam disc 362.

Going to FIG. 12, and keeping in mind that cam disc 362 rotates with respect to blade 12 on which follower pins 310 and 344 are mediately mounted, it will be seen that so long as follower pins 310 and 348 are both traversing the circular portions of their associated cam tracks 364, 366 toggle arm 280 will be maximally deflected and thus the angle of attack of blade 12 will remain substantially the same, i.e., about 100°.

It will also be evident from comparison of FIGS. 7 and 12 that at each transition point, i.e., when the axis of follower pin 310 is at cusp point 572 or the axis of follower pin 348 is at cusp point 542, the axes of both follower pins will lie in a common plane with the axis of cam disc 362, and thus toggle arm 280 will also lie in that common plane, i.e., in its neutral position, vane 50 will be passing rapidly through the chord of blade 12, and the angle of attack of blade 12 will momentarily be zero.

Since, as pointed out above, radius arm 22 is substantially perpendicular to the chord of blade 12 when toggle arm 280 is in its neutral position, and since the angle of attack of blade 12 is zero when toggle arm 280 is in its neutral position, it follows that the angle of attack of blade 12 is changing from positive to negative, or vice versa, i.e., being reversed, when the angle of blade 12 with respect to radius arm 22 is going from inside the perpendicular to the radius arm at the blade pivot axis to outside of that perpendicular, or vice versa, and thus blade 12 will always have a tangential thrust component driving rotor 10 forward.

Referring to FIG. 12, it can also be seen that the follower pins 310, 348 remain in the circular portions of their associated cam tracks for more than 90° of cam rotation. Thus, blade 12 remains at each maximum angle of attack for more than 50% of each excursion of vane 50 from its neutral position. In some actual cam toggle mechanisms constructed in accordance with the present invention these dwell periods can be as much as 110° of cam rotation. This novel and inventive structural feature of the present invention makes it possible to attain high degrees of wind power extraction efficiency.

While the wind turbine of the preferred embodiment of the present invention is rotating, and the blades 12, 14, 16, 18 are being cyclically caused to successively assume positive and negative angles of attack by their associated vanes 50, 52, 54, 56, which are themselves caused to cyclically assume positive and negative deflections by their associated cam toggle mechanisms 250, 250A, 250B, 250C, all as described immediately above, the maximum deflection of the vanes 50, 52, 54, and 56, and thus the maximum angle of attack of their associated blades 12, 14, 16, 18 can be changed by manual or automatic adjustments of the vane deflection limit setting means shown principally in FIGS. 5 and 6.

Each blade-vane combination is provided with such vane deflection limit setting means. For the purpose of this discussion, however, only the vane deflection limit setting means associated with blade 12 and vane 50 will be discussed, it being understood that the vane deflection limit setting means associated with blades 14, 16, and 18 are substantially identical in structure and operate in the same manner.

The principal parts of the vane deflection limit setting means are wedge 168 (FIGS. 3 and 5) and stops 194 and 198 (FIGS. 3, 5 and 6).

Wedge 168 is affixed to lower vane support arm 84. Stops 194 and 198 are slidable along the lowest rib 86 of blade 12.

As best seen by comparing FIGS. 3 and 5, wedge 164 lies between stops 194 and 198. As stops 194 and 198 are jointly moved toward the leading edge of blade 12 their adjacent, angulated surfaces approach the angulated surfaces of wedge 168 and ultimately come into contact with the angulated surfaces of wedge 168.

Since wedge 168 is mounted on lower vane support arm 84, which carries vane 50 and thus must be deflected in order to deflect vane 50, it follows that vane 50 can be deflected only until wedge 168 contacts one of the stops 194, 198. It also follows that the closer stops 194, 198 are located to the leading edge of blade 12, and therefore the closer the angulated surfaces of wedge 168 and stops 194, 198 are juxtaposed, the smaller the angle through which vane 50 can be deflected by the operation of cam toggle mechanism 250, etc.

It will also be seen that when stops 194, 198 are so close to the leading edge of blade 12 that they both contact wedge 168 vane 50 cannot be deflected at all, and thus blade 12 will be feathered, i.e., will remain at zero angle of attack.

As may be seen from FIG. 3, stops 194 and 198 are positioned by the operation of control wire 234 and control rod 212 against the urging of control rod retracting spring 222.

Referring to FIG. 19, it will be seen that toroidal weight 488 provides a force which acts against the urging of control rod retracting spring 222 (FIG. 3), providing a tendency to move stops 194, 198 away from the leading edge of blade 12 (FIG. 3).

This balanced-force mechanism, in accordance with a particular feature of the present invention, provides a "fail-safe" feature, in that accidental parting of control wire 243 will immediately allow retracting spring 222 to contract, and thus to move stops 194, 198 toward the leading edge of blade 12, and into contact with wedge 168, feathering blade 12 and shutting it down.

Returning to FIG. 13, it will be seen that toroidal weight 488 can be raised by raising collar 498 and thus raising its projecting rollers 520, 522, 524, 526, which are disposed below weight 488. Collar 498 can be manually raised by means of a manual control lever (not shown) which acts on collar 498 through a link 502.

The manual control lever is provided with a set of detents of well-known type whereby it may be retained in any one of a corresponding plurality of positions, and thus toroidal weight 488 may be retained in any one of a corresponding plurality of positions.

As may be seen from comparison of FIGS. 3 and 13, particular positions of stops 194 and 198 correspond to each manual control lever detent position, and thus a particular deflection angle of vane 50 and a particular angle of attack of blade 12 will correspond to each detent position of said manual control lever.

As described above, all of the cam toggle mechanisms 250, 250A, 250B, 250C continue to deflect their associated toggle arms 280, 280A, 280B, and 280C from side-to-side as long as the wind turbine of the preferred embodiment continues to rotate. The angular extent of the deflections of the toggle arms 280, 280A, 280B, and 280C from their neutral or center positions does not decrease, even when the stops 194, 194A, 194B, 194C, 198, 198A, 198B, 198C are in contact with their associated wedges 168, 168A, 168B, 168C and thus none of the lower vane support arms 84, 84A, 84B, 84C can be deflected at all.

In order to permit the toggle arms 280, 280A, 280B, 280C to continue to oscillate when the maximum deflection of the corresponding vanes 50, 52, 54, 56 has been curtailed or reduced to zero by the stops 194, 194A, 194B, 194C, 198, 198A, 198B, 198C and wedges 168, 168A, 168B, 168C, a lost motion coupling 152, 152A, 152B, 152C is provided between each lower vane support arm 84, 84A, 84B, 84C and its associated fork arm 114, 114A, 114B, 114C.

Comparing FIG. 3 and FIG. 4, and considering only the lost motion coupling associated with vane 50, it will be seen that fork arm 114 must execute an excursion from its neutral position each time toggle arm 280 executes a corresponding excursion from its neutral position, and that, as with toggle arm 280, the magnitude of the excursions of fork arm 114 does not decrease when the maximum deflection of lower support arm 84 is limited or completely prevented by wedge 168 and stops 194 and 198.

When, for example, the lower support arm 84 is locked in its neutral position by wedge 168 and stops 194, 198 and then fork arm 114 moves to the right (downward in FIG. 4), the roller 144 which is mounted on the top of fork arm 114 passes through an opening 145 in the flange 92 of lower vane support arm 84 and bears against the inner surface of spring arm 135, which is pivotably mounted on lower vane support arm 84 by means of a hinge pin 134, etc. Arm 135 is then forced outwardly by the pressure of roller 144 on its inner surface, and is permitted to move outwardly by the yielding of coil spring 150.

Thus, when lower vane support arm 84 is prevented from executing full excursions by wedge 168 and stops 194, 198 coil spring 150 yields and prevents damage to the mechanism of the wind turbine of the preferred embodiment of the present invention.

In the case of leftward excursions, roller 147 passes through opening 149 and thrusts arm 137 outward against the urging of coil spring 150, thereby permitting fork arm 114 to oscillate leftwardly without damaging the mechanism of the turbine.

The manner of operation of the overspeed control of FIGS. 13 and 14, and the manner of operation of the low wind control of FIG. 19, are described in detail at those places above at which the structures of those controls are described.

It will thus be seen that the objects set forth above, among those made apparent from the preceding description, are efficiently attained, and since certain changes may be made in the above constructions without departing from the scope of the present invention it is intended that all matter contained in the above description or shown in the accompanying drawings shall be interpreted as illustrative only and not in a limiting sense.

It is particularly noted that although the present invention has been disclosed as employing face cams having one track on each face as the toggle cams, other types of face cams may be used as the toggle cams in carrying out the present invention.

For example, it is contemplated that the use of a double groove face cam having both grooves or tracks in one face of the cam with one groove or track for each follower pin may allow a single level cam and toggle arrangement to work satisfactorily with attendant simplification of the cam-toggle mechanism. Such a construction would, however, increase the size of the cam and reduce the pivot arm swing for the same sized pivot pins.

Yet further, it is contemplated that it may be desirable in some embodiments of the present invention, especially where simplicity of cam-toggle mechanism structure is of major importance, to employ Reuleaux cams in square yokes rather than face cams in the cam-toggle mechanisms. Examples of Reulaux cams and cooperating square yokes are shown, for example, at page 159 of the *Engineers' Illustrated Thesaurus*, by Herbert Herkimer, William Penn Publishing Company, New York, New York, 1952, figures K and L. It is to be understood, however, that other Reuleaux cams than the "curved triangle" cams shown in said figures K and L may be used in certain embodiments of the present invention. Thus, Reuleaux cams of the symmetrical, rounded corner type or generalized Reuleaux cams of the unsymmetrical type should also be considered in connection with the design of particular embodiments of the present invention. As will now be seen, the expression "Reuleaux cam" as used herein is not limited to the most often seen "curved triangle" Reuleaux cams but rather denotes any plate cam the profile of which is a non-circular curve of constant width, i.e., a non-circular curve which will rotate snugly within a square, maintaining contact at all times with all sides of the square.

Other positive-action, compound harmonic motion arrangements shown and described in prior art patents and literature, such as conjugate cams pairs or geneva movements, may be used in the cam-toggle mechanism without exceeding the scope of the present invention.

The present invention is not limited to the employment of four blades, as in the preferred embodiment. Six or more blades may be used in certain preferred embodiments.

It is also to be understood that the following claims are intended to cover all of the generic and specific features of the invention hereindescribed, and all statements of the scope of the invention which as a matter of language might be said to fall therebetween.

What is claimed is:

1. A wind turbine, comprising:
   airfoil means for deriving lift from wind moving therepast;
   support arm means for supporting said airfoil means for rotation about the axis of the wind turbine;
   airfoil pivot means for permitting said airfoil means to pivot with respect to said support arm means in response to said wind;
   aerodynamic airfoil orienting means for aerodynamically orienting associated ones of said airfoil means with respect to said wind; and
   deflecting means for alternately deflecting said airfoil orienting means to one side of the chords of their associated airfoil means and then to the other and causing said airfoil orienting means to dwell on both sides of the chords of their associated airfoil means.

2. A wind turbine as claimed in claim 1 in which each of said deflecting means comprises cam means having dwell portions.

3. A wind turbine as claimed in claim 2 in which each of said cam means comprises a first cam track and a second cam track and the contour of each of said cam tracks includes a pair of dwell portions.

4. A wind turbine as claimed in claim 1 in which each of said aerodynamic airfoil orienting means comprises vane means located remotely from said airfoil means and pivoted arm means for pivotably mounting said vane means on said airfoil means.

5. A wind turbine as claimed in claim 4 in which each of said deflecting means comprises cam means having dwell portions.

6. A wind turbine as claimed in claim 5 in which each of said cam means comprises a first cam track and a second cam track and the contour of each of said cam tracks includes a pair of dwell portions.

7. A wind turbine as claimed in claim 4 in which each of said deflecting means comprises cam means having dwell portions and cuspate portions.

8. A wind turbine as claimed in claim 7 in which each of said cam means comprises a first cam track and a second cam track and the contour of each of said cam tracks includes a pair of dwell portions and a cuspate portion.

9. A wind turbine as claimed in claim 8 in which the contour of each of said cam tracks further includes a non-singular active portion.

10. A wind turbine as claimed in claim 8 in which the aspect ratio of said airfoil means is greater than 2.

11. A wind turbine as claimed in claim 8 in which the aspect ratio of said airfoil means is greater than 2 and the plan form of said airfoil means is substantially rectangular.

12. A wind turbine as claimed in claim 1 in which each of said deflecting means comprises cam means having dwell portions and cuspate portions.

13. A wind turbine as claimed in claim 12 in which each of said cam means comprises a first cam track and a second cam track and the contour of each of said cam tracks includes a pair of dwell portions and a cuspate portion.

14. A wind turbine as claimed in claim 13 in which the contour of each of said cam tracks further includes a non-singular active portion.

15. A wind turbine, comprising:
   airfoil means for deriving lift from wind moving therepast;
   support arm means for supporting said airfoil means for rotation about the axis of the wind turbine;
   airfoil pivot means for permitting said airfoil means to pivot with respect to said support arm means in response to said wind;
   aerodynamic airfoil orienting means for aerodynamically orienting associated ones of said airfoil means with respect to said wind; and
   deflecting means for alternately deflecting said airfoil orienting means to one side of the chords of their associated airfoil means and then to the other and causing said airfoil orienting means to dwell on both sides of the chords of their associated airfoil means, each of said deflecting means comprising toggle means, toggle cam means for operating said toggle means, and transition cam means for positively impelling said toggle means through transition points of said toggle cam means.

16. A wind turbine as claimed in claim 15 in which each of said toggle cam means comprises a first cam track and a second cam track and the contour of each of said cam tracks includes a pair of dwell portions.

17. A wind turbine as claimed in claim 15 in which each of said toggle cam means comprises a first cam track and a second cam track and the contour of each of said cam tracks includes a pair of dwell portions and a cuspate portion.

18. A wind turbine as claimed in claim 17 in which said transition points are located at the cusps of said cuspate portions.

19. A wind turbine as claimed in claim 1 in which the aspect ratio of said airfoil means is greater than 2.

20. A wind turbine as claimed in claim 1 in which the aspect ratio of said airfoil means is greater than 2 and the plan form of said airfoil means is substantially rectangular.

21. A wind turbine as claimed in claim 1, further comprising:
- first bearing means affixed to the ground beneath said turbine and having its axis of rotation vertically oriented;
- second bearing means suspended directly over said first bearing means and having its axis of rotation collinear with the axis of rotation of said first bearing means; and
- vertical mast means rotatably mounted in said first and second bearing means for rotation about a vertical axis, said support arm means being affixed to said mast for rotation therewith.

22. A wind turbine as claimed in claim 21, further comprising:
- a plurality of upright strut means, the foot of each of said strut means being affixed to the ground outside of the sweep of said support arm means;
- a plurality of anchor means, each of said anchor means being affixed to the ground at a point so located that an associated one of said strut means lies between that point and said mast means;
- a plurality of guy means interconnecting each of said anchor means and the upper end of its associated strut means;
- a first plurality of stay means interconnecting the upper ends of said strut means with said second bearing means; and
- a second plurality of stay means interconnecting the upper ends of the adjacent ones of said strut means.

23. A wind turbine, comprising:
- airfoil means for deriving lift from wind moving therepast;
- support arm means for supporting said airfoil means for rotation about the axis of the wind turbine;
- airfoil pivot means for permitting said airfoil means to pivot with respect to said support arm means in response to said wind;
- aerodynamic airfoil orienting means for aerodynamically orienting associated ones of said airfoil means with respect to said wind;
- deflecting means for alternately deflecting said airfoil orienting means to one side of the chords of their associated airfoil means and then to the other and causing said airfoil orienting means to dwell on both sides of the chords of their associated airfoil means; and
- deflection limiting means for selectively limiting the angular extent of the deflections of said airfoil orienting means.

24. A wind turbine as claimed in claim 23 in which said deflection limiting means are capable of limiting the angular extent of the deflections of said airfoil orienting means substantially to zero.

25. A wind turbine as claimed in claim 23, further comprising manually operable means for adjusting said deflection limiting means and thus manually determining the angular extent of the deflections of said airfoil orienting means.

26. A wind turbine as claimed in claim 23, further comprising automatically operated shutdown means for automatically adjusting said deflection limiting means to reduce the angular extent of the deflections of said airfoil orienting means substantially to zero over a predetermined range of turbine rotor speeds, thereby shutting down the turbine at the highest speed in said range to prevent runaway.

27. A wind turbine as claimed in claim 25 in which said deflection limiting means are capable of limiting the angular extent of the deflections of said airfoil orienting means substantially to zero and said manually operable means are capable of adjusting said deflection limiting means to limit the angular extent of the deflections of said airfoil orienting means substantially to zero and thus shutting down the turbine under manual control.

28. A wind turbine as claimed in claim 26 in which said automatically operated shutdown means include centrifugal mass means for providing centrifugal force to operate said deflection limiting means.

29. A wind turbine as claimed in claim 28, further comprising resilient means for resiliently restraining said centrifugal mass means from responding to the centrifugal force produced by the rotation of the turbine and centrifugal force coupling means for coupling said centrifugal mass means to said deflection limiting means over said predetermined range of turbine rotor speeds whereby to cause said deflection limiting means to progressively reduce the angular extent of the deflections of said airfoil orienting means as the speed of the turbine increases through said predetermined range of turbine rotor speeds until the angular extent of the deflections of said airfoil orienting means is zero at a said highest speed and thus the turbine is shut down at said highest speed.

30. A wind turbine as claimed in claim 23, further comprising automatically operated control means for automatically operating said deflection limiting means to reduce the angular extent of the deflections of said airfoil orienting means when the tangential speed of said airfoil means in traveling around the axis of the turbine is substantially greater than the speed of the wind approaching the turbine.

31. A wind turbine as claimed in claim 30 in which said automatically operated control means comprises wind strength responsive means for producing a force which varies in accordance with the strength of the wind at the turbine and wind force coupling means for coupling said force which varies in accordance with the strength of the wind at the turbine to said deflection limiting means to cause said deflection limiting means to reduce the angular extent of the deflections of said airfoil orienting means when the strength of the wind at the turbine is low.

32. A wind turbine as claimed in claim 1 in which each of said deflecting means comprises cam means having cam tracks the contours of which are substantially as shown in FIGS. 15 and 16 and tabulated in Tables I, II, III and IV.

33. A wind turbine, comprising:
- airfoil means for deriving lift from wind moving therepast;
- support arm means for supporting said airfoil means for rotation about the axis of the wind turbine;
- airfoil pivot means for permitting said airfoil means to pivot with respect to said support arm means in response to said wind;
- aerodynamic airfoil orienting means for aerodynamically orienting associated ones of said airfoil means with respect to said wind; and
- deflecting means for alternately deflecting said airfoil orienting means to one side of the chords of their associated airfoil means and then to the other and causing said airfoil orienting means to dwell on both sides of the chords of their associated airfoil means, said airfoil orienting means being in transit between their two dwell positions for no more than 50% of the duration of each rotation of the turbine.

34. A wind turbine as claimed in claim 1 in which each of said deflecting means comprises a plate cam the profile of which includes first and second oppositely located circular portions of different radius.

35. A wind turbine, comprising:
airfoil means for deriving lift from wind moving therepast;
support arm means for supporting said airfoil means for rotation about the axis of the wind turbine;
airfoil pivot means for permitting said airfoil means to pivot with respect to said support arm means in response to said wind;
aerodynamic airfoil orienting means for aerodynamically orienting associated ones of said airfoil means with respect to said wind; and
deflecting means for alternately deflecting said airfoil orienting means to one side of the chords of their associated airfoil means and then to the other and causing said airfoil orienting means to dwell on both sides of the chords of their associated airfoil means, each of said deflecting means comprising a plate cam the profile of which includes first and second oppositely located circular portions of different radius, and further comprising rocker means and a pair of cam follower means mounted on said rocker means for following the profile of said plate cam as said plate cam is rotated and thus rocking said rocker means between two extreme positions and causing said rocker means to dwell in said extreme positions while said cam follower means traverse said circular portions.

36. A cam toggle mechanism for causing a toggle arm to reciprocate between a first dwell position and a second dwell position in response to the rotation of an input shaft, comprising:
a face cam affixed to said input shaft for conjoint rotation therewith;
a first cam track in a first face of said face cam, said first cam track including a cuspate portion, a non-singular, non-circular portion, and first and second circular portions located between said cuspate portion and said non-singular, non-circular portion;
a second cam track in the second face of said face cam, said second cam track including a cuspate portion, a non-singular, non-circular portion, and first and second circular portions located between said cuspate portion and said non-singular, non-circular portion, the cusp of said cuspate portion of said second cam track being located on the opposite side of said input shaft from the cusp of said cuspate portion of said first cam track;
first toggle bearing means located adjacent said first face of said face cam at a predetermined distance from the axis of said input shaft and so positioned and oriented that its pivot axis is parallel to the axis of said input shaft, said toggle arm being affixed to the journal of said first toggle bearing means for conjoint pivoting therewith;
second toggle bearing means located adjacent said second face of said face cam and so positioned and oriented as to be coaxial with said first toggle bearing means;
first cam follower support means located between said first toggle bearing means and said first face of said face cam and affixed to said journal of said first toggle bearing means for conjoint pivoting therewith;
second cam follower support means located between said second toggle bearing means and said second face of said face cam and affixed to the journal of said second toggle bearing means;
a first cam follower mounted on said first cam follower support means for following said first cam track and journalled in said first cam follower support means for rotation about its own axis;
a second cam follower mounted on said second cam follower support means for following said second cam track and journalled in said second cam follower support means for rotation about its own axis, the axis of said second cam follower being coplanar with the axis of said first cam follower and with the common axis of said toggle bearing means; and
yoke means for joining said first and second cam follower support means for conjoint pivoting about the common axis of said toggle bearing means;
the adjacent circular portions of said first and second cam tracks being of equal radius and being offset from each other by an angle subtended at the axis of said face cam which is equal to the angle subtended at the axis of said face cam by the axes of said cam followers when said cam followers are both traversing circular portions of their associated cam tracks, the radial distance between each of said cusps and the adjacent portion of the other cam track being such that the axes of said cam followers are coplanar with the axis of said face cam when either of said cam followers is located at the cusp of its associated cam track, the cusp of said first cam track being located closer to the axis of said face cam than said non-singular, non-circular portion of said second cam track, and the cusp of said second cam track being located further from the axis of said face cam than said non-singular, non-circular portion of said first cam track.

37. A cam toggle mechanism as claimed in claim 36, further comprising:
a third cam follower projecting from said first face of said face cam and journalled in said face cam for rotation about its own axis;
a fourth cam follower projecting from said second face of said face cam and journalled in said face cam for rotation about its own axis;
first transition cam means united with said first cam follower support means and so located on said first cam follower support means as to cooperate with said third cam follower to positively impel said toggle arm to pass through its neutral state of operation wherein said second cam follower is passing through the cusp of its associated cam track; and
second transition cam means united with said second cam follower support means and so located on said second cam follower support means as to cooperate with said fourth cam follower to positively impel said toggle arm to pass through its neutral state of operation wherein said first cam follower is passing through the cusp of its associated cam track.

38. A wind turbine, comprising:
airfoil means for deriving lift from wind moving therepast;
support arm means for supporting said airfoil means for rotation about the axis of the wind turbine;

airfoil pivot means for permitting said airfoil means to pivot with respect to said support arm means in response to said wind;

aerodynamic airfoil orienting means for aerodynamically orienting associated ones of said airfoil means with respect to said wind;

cam toggle means for causing a toggle arm to rapidly angularly reciprocate between a first dwell position and a second dwell position in synchronism with the rotation of the wind turbine;

pivotable mounting means for pivotably mounting said airfoil orienting means on said airfoil means;

first lever means connected to said airfoil orienting means for pivoting therewith about the axis of said pivotable mounting means;

second lever means located adjacent said first lever means and pivotable about the axis of said pivot means;

wedge means affixed to the side of said first lever means adjacent said airfoil means;

guide means affixed to said airfoil means adjacent said wedge means;

carrier means slidable in said guide means parallel to the chord of said airfoil means;

first and second stop means affixed to said carrier means and located on opposite sides of said wedge means;

carrier positioning means for selectively positioning said carrier means along said guide means and thus selectively positioning said stop means along said wedge means and correspondingly limiting the maximum angular deflection of said first lever means;

fork means affixed to said second lever means and engaging a projection on said toggle arm so that said second lever means reciprocates and dwells in synchronism with said toggle arm; and lost motion means coupling said first lever means to said second lever means and permitting said second lever means to reciprocate with said toggle arm when said stop means are so positioned with respect to said wedge means as to limit or completely prevent the deflection of said first lever means toward said dwell positions.

39. A wind turbine as claimed in claim 38 in which each of said carrier positioning means comprises:

carrier retracting spring means having a first end affixed to its associated carrier means and a second end fixed with respect to its associated airfoil means;

elongated flexible control means having a first end portion located adjacent said associated airfoil means and a second portion extending along the associated support arm means;

first coupling means for coupling said first end portion of said elongated flexible control means to said associated carrier means so that the stop means associated with said carrier means are moved toward the wedge means associated with said carrier means when said second portion of said elongated flexible control means is drawn toward the axis of the wind turbine;

massive carriage means slidably mounted on the support arm means associated with said associated carrier means;

resilient means for resiliently restraining said massive carriage means against movement away from the axis of the wind turbine in response to the centrifugal force resulting from the rotation of the turbine;

attaching means for attaching the end of said elongated flexible control means remote from said first end portion to a toroidal weight; and second coupling means for coupling said massive carriage to said elongated flexible control means at a predetermined speed of rotation of the wind turbine.

40. A wind turbine as claimed in claim 39, further comprising manually operable control means for raising and lowering said toroidal weight and detenting means for maintaining said toroidal weight at any selected one of a plurality of predetermined elevations.

41. A wind turbine as claimed in claim 40, further comprising:

a rotatable mast carrying said support arm means;

an extension of said rotatable mast extending a predetermined distance above said support arm means;

anti-friction bearing means located at the upper end of said mast extension;

a flexible tension member passing through said anti-friction bearing means and extending downwardly through the interior of said mast extension and said mast;

a wind drogue attached to the upper end of said flexible tension member at a point remote from said anti-friction bearing means;

a terminating member attached to the end of said flexible tension member located inside said mast; and a plurality of lever means pivotably mounted in openings in said mast, the inner ends of said lever means being coupled to said terminating member and the outer ends of said lever means being coupled to said toroidal weight for transmitting to said toroidal weight the wind forces derived by said wind drogue means from the winds passing over the turbine.

42. A cam toggle mechanism for causing a toggle arm to reciprocate between a first dwell position and a second dwell position in response to the rotation of an input shaft, comprising:

a plate cam affixed to said input shaft for conjoint rotation therewith, the profile of said plate cam comprising a first circular arc of more than 100° in angular extent and a second circular arc of smaller radius than the radius of said first circular arc and of more than 100° in angular extent;

a rocker member pivotably mounted for pivoting about an axis parallel to the axis of said input shaft;

a first cam follower roller mounted on said rocker member for freely rotating about an axis parallel to the axis of said rocker member;

a second cam follower roller mounted on said rocker member for freely rotating about an axis parallel to the axis of said rocker member; the periphery of said cam follower rollers being spaced apart by a distance substantially equal to the sum of the radii of said circular arcs;

a toggle arm mounted on a shaft located closely adjacent a circular portion of the periphery of said rocker member;

a first strap having a first end affixed to the periphery of said rocker member near one end of said circular portion thereof;

a second strap having a first end affixed to the periphery of said rocker member near the other end of said circular portion thereof;

fastening means for fastening the second end of said first strap and the second end of said second strap to the shaft on which said toggle arm is mounted;

said cam follower rollers being so positioned as to remain in contact with the periphery of said plate cam, whereby said rocker member is rocked between two extreme positions and dwells in both of said extreme positions each time said input shaft is rotated through 360°; and said first and second straps being tightly wrapped around the shaft on which said toggle arm is mounted, in opposite directions, whereby said toggle arm reciprocates between a first dwell position and a second dwell position and dwells in each of those dwell positions each time said input shaft is rotated through 360°.

* * * * *